United States Patent
Jarc et al.

(10) Patent No.: US 11,727,827 B2
(45) Date of Patent: *Aug. 15, 2023

(54) ANATOMICAL MODEL AND METHOD FOR SURGICAL TRAINING

(71) Applicant: Intuitive Surgical Operations, Inc., Sunnyvale, CA (US)

(72) Inventors: Anthony M. Jarc, Johns Creek, GA (US); Christopher J. Sanchez, Mountain View, CA (US); Timothy V. White, Scottsdale, AZ (US); Eugene T. Nagel, Scottsdale, AZ (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/177,028

(22) Filed: Feb. 16, 2021

(65) Prior Publication Data

US 2021/0209966 A1 Jul. 8, 2021

Related U.S. Application Data

(60) Continuation of application No. 16/807,077, filed on Mar. 2, 2020, now Pat. No. 10,943,508, which is a continuation of application No. 15/190,133, filed on Jun. 22, 2016, now Pat. No. 10,580,326, which is a division of application No. 13/968,253, filed on Aug. 15, 2013, now abandoned.

(60) Provisional application No. 61/684,376, filed on Aug. 17, 2012.

(51) Int. Cl.
G09B 23/30 (2006.01)
G09B 23/28 (2006.01)

(52) U.S. Cl.
CPC .......... *G09B 23/30* (2013.01); *G09B 23/285* (2013.01)

(58) Field of Classification Search
CPC ..................................................... G09B 23/30
USPC ......................................................... 434/267
See application file for complete search history.

(56) References Cited

U.S. PATENT DOCUMENTS

| | | |
|---|---|---|
| 4,321,047 A | 3/1982 | Landis |
| 5,403,191 A | 4/1995 | Tuason |
| 5,620,326 A | 4/1997 | Younker |
| 5,766,016 A | 6/1998 | Sinclair et al. |
| 5,769,640 A | 6/1998 | Jacobus et al. |
| 5,800,177 A | 9/1998 | Gillio |

(Continued)

FOREIGN PATENT DOCUMENTS

| | | |
|---|---|---|
| CN | 1488127 A | 4/2004 |
| CN | 102254476 A | 11/2011 |

(Continued)

OTHER PUBLICATIONS

Extended European Search Report for Application No. 14871282.1, dated Jun. 7, 2017, 7 pages.

(Continued)

*Primary Examiner* — Thomas J Hong
(74) *Attorney, Agent, or Firm* — IP Spring

(57) ABSTRACT

Implementations relate to anatomical models and surgical training. In some implementations, an anatomical training model includes a base portion and a top portion that form a hollow space between the base portion and top portion. A plurality of holes are positioned in the top portion. The model includes a plurality of cannula supports, where each cannula support is aligned with one or more corresponding holes in the top portion.

20 Claims, 20 Drawing Sheets

(56) References Cited

U.S. PATENT DOCUMENTS

| | | |
|---|---|---|
| 5,945,056 A | 8/1999 | Day et al. |
| 5,951,301 A | 9/1999 | Younker |
| 6,024,576 A | 2/2000 | Bevirt et al. |
| 6,377,011 B1 | 4/2002 | Ben-Ur |
| 6,544,041 B1 | 4/2003 | Damadian |
| 7,706,000 B2 | 4/2010 | Cohen et al. |
| 7,798,815 B2 | 9/2010 | Ramphal et al. |
| 7,866,983 B2 | 1/2011 | Hemphill et al. |
| 8,073,528 B2 | 12/2011 | Zhao et al. |
| 8,190,238 B2 | 5/2012 | Moll et al. |
| 8,469,716 B2 | 6/2013 | Fedotov et al. |
| 8,600,551 B2 | 12/2013 | Itkowitz et al. |
| 8,786,675 B2 | 7/2014 | Deering |
| 9,196,176 B2 | 11/2015 | Hager et al. |
| 9,812,035 B2 | 11/2017 | Stuart et al. |
| 10,510,267 B2 | 12/2019 | Jarc et al. |
| 10,580,326 B2 | 3/2020 | Jarc et al. |
| 10,648,790 B2 | 5/2020 | Foster et al. |
| 10,943,508 B2 | 3/2021 | Jarc et al. |
| 2004/0045561 A1 | 3/2004 | Alexander et al. |
| 2004/0126746 A1 | 7/2004 | Toly |
| 2005/0142525 A1 | 6/2005 | Cotin et al. |
| 2006/0019228 A1 | 1/2006 | Riener et al. |
| 2006/0073454 A1 | 4/2006 | Hyltander et al. |
| 2006/0099557 A1 | 5/2006 | Hyltander et al. |
| 2007/0275359 A1 | 11/2007 | Rotnes et al. |
| 2007/0292829 A1 | 12/2007 | King et al. |
| 2007/0293734 A1 | 12/2007 | Coste-Maniere et al. |
| 2008/0187896 A1 | 8/2008 | Savitsky |
| 2008/0227073 A1 | 9/2008 | Bardsley et al. |
| 2009/0132925 A1 | 5/2009 | Koehler et al. |
| 2009/0142739 A1 | 6/2009 | Wang et al. |
| 2009/0176196 A1 | 7/2009 | Niblock et al. |
| 2009/0248037 A1 | 10/2009 | Prisco |
| 2009/0253109 A1 | 10/2009 | Anvari et al. |
| 2009/0263775 A1 | 10/2009 | Ullrich |
| 2009/0317002 A1 | 12/2009 | Dein |
| 2009/0326324 A1 | 12/2009 | Munoz et al. |
| 2010/0035223 A1 | 2/2010 | Shibui et al. |
| 2010/0086905 A1 | 4/2010 | Illana et al. |
| 2010/0099066 A1 | 4/2010 | Mire et al. |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0216105 A1 | 8/2010 | Hammerman |
| 2010/0285438 A1 | 11/2010 | Kesavadas et al. |
| 2010/0311028 A1 | 12/2010 | Bell, III et al. |
| 2011/0014596 A1 | 1/2011 | Kurenov et al. |
| 2011/0046935 A1 | 2/2011 | Sugaya |
| 2011/0086332 A1 | 4/2011 | Speiser et al. |
| 2011/0117530 A1 | 5/2011 | Albocher et al. |
| 2011/0152882 A1 | 6/2011 | Wenderow et al. |
| 2011/0212426 A1 | 9/2011 | Gloeggler et al. |
| 2011/0256519 A1 | 10/2011 | Park et al. |
| 2012/0045742 A1 | 2/2012 | Meglan et al. |
| 2012/0053402 A1 | 3/2012 | Conlon et al. |
| 2012/0058457 A1 | 3/2012 | Savitsky |
| 2012/0082970 A1 | 4/2012 | Pravong et al. |
| 2012/0115118 A1 | 5/2012 | Marshall |
| 2012/0135387 A1 | 5/2012 | Morrow et al. |
| 2012/0148994 A1 | 6/2012 | Hori et al. |
| 2012/0251987 A1 | 10/2012 | Huang et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2013/0101973 A1 | 4/2013 | Hoke et al. |
| 2013/0157240 A1 | 6/2013 | Hart et al. |
| 2013/0189663 A1 | 7/2013 | Tuchschmid et al. |
| 2013/0192741 A1 | 8/2013 | Trotta et al. |
| 2013/0218340 A1 | 8/2013 | Hager et al. |
| 2013/0230837 A1 | 9/2013 | Meglan et al. |
| 2013/0288217 A1 | 10/2013 | Hammerman |
| 2013/0295540 A1 | 11/2013 | Kesavadas et al. |
| 2014/0011172 A1 | 1/2014 | Lowe |
| 2014/0051049 A1 | 2/2014 | Jarc et al. |
| 2014/0057236 A1 | 2/2014 | Meglan et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0093854 A1 | 4/2014 | Poulsen et al. |
| 2014/0106328 A1 | 4/2014 | Loor |
| 2014/0272878 A1 | 9/2014 | Shim et al. |
| 2014/0272879 A1 | 9/2014 | Shim et al. |
| 2014/0287393 A1 | 9/2014 | Kumar et al. |
| 2014/0329217 A1 | 11/2014 | Barsness et al. |
| 2015/0037775 A1 | 2/2015 | Ottensmeyer et al. |
| 2015/0100066 A1 | 4/2015 | Kostrzewski et al. |
| 2015/0132732 A1 | 5/2015 | Hart et al. |
| 2015/0262511 A1 | 9/2015 | Lin et al. |
| 2015/0325151 A1 | 11/2015 | Tuchschmid et al. |
| 2015/0356891 A1 | 12/2015 | Will |
| 2016/0098933 A1 | 4/2016 | Reiley et al. |
| 2016/0314716 A1 | 10/2016 | Grubbs |
| 2016/0379504 A1 | 12/2016 | Bailey et al. |
| 2020/0020249 A1 | 1/2020 | Jarc et al. |

FOREIGN PATENT DOCUMENTS

| | | |
|---|---|---|
| CN | 102362302 A | 2/2012 |
| CN | 103077633 A | 5/2013 |
| EP | 1909246 A1 | 4/2008 |
| JP | 2001150368 A | 6/2001 |
| JP | 2006087936 A | 4/2006 |
| JP | 2007007041 A | 1/2007 |
| JP | 2009529951 A | 8/2009 |
| JP | 2009236963 A | 10/2009 |
| JP | 2010082189 A | 4/2010 |
| JP | 2012005557 A | 1/2012 |
| JP | 2012521568 A | 9/2012 |
| KR | 20110065388 A | 6/2011 |
| KR | 20120122542 A | 11/2012 |
| WO | WO-9825666 A1 | 6/1998 |
| WO | WO-9917265 A1 | 4/1999 |
| WO | WO-9942978 A1 | 8/1999 |
| WO | WO-0030548 A1 | 6/2000 |
| WO | WO-02059859 A1 | 8/2002 |
| WO | WO-2006039092 A2 | 4/2006 |
| WO | WO-2006060406 A1 | 6/2006 |
| WO | WO-2009094621 A2 | 7/2009 |
| WO | WO-2010025338 A1 | 3/2010 |
| WO | WO-2010105237 A2 | 9/2010 |
| WO | WO-2010117685 A2 | 10/2010 |
| WO | WO-2015095715 A1 | 6/2015 |

OTHER PUBLICATIONS

International Preliminary Report on Patentability for Application No. PCT/US2014/071521, dated Jun. 30, 2016, 7 pages.
International Search Report and Written Opinion for Application No. PCT/US14/71521, dated Mar. 31, 2015, 11 pages.
Office Action dated Feb. 20, 2019 for Chinese Application No. 201480076076 filed Dec. 19, 2014, 25 pages.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Extended European Search Report for Application No. EP22205491. 8, dated Mar. 7, 2023, 6 pages.

ANATOMICAL MODEL AND METHOD FOR SURGICAL TRAINING

CROSS-REFERENCE TO RELATED APPLICATIONS

This application is a continuation of U.S. patent application Ser. No. 16/807,077, filed Mar. 2, 2020, entitled "Anatomical Model and Methods for Surgical Training," which is a continuation of U.S. patent application Ser. No. 15/190,133, filed Jun. 22, 2016, entitled "Anatomical Model and Method for Surgical Training" (now U.S. Pat. No. 10,580,326), which is a divisional of U.S. patent application Ser. No. 13/968,253, filed Aug. 15, 2013, entitled "Anatomical Model and Method for Surgical Training," which claims priority to U.S. Provisional Application No. 61/684,376, filed Aug. 17, 2012, all of which are incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Disclosed features concern medical training equipment and methods, and more particularly medical training equipment and methods used for training in minimally invasive surgical procedures and techniques.

Minimally invasive surgical instrument port placement in a patient's anatomy, setup positioning of a minimally invasive surgical robotic system, and coupling the robotic system to cannulas positioned in the ports ("docking" the robot to the cannulas) are important tasks for surgeons and medical personnel to learn. Physical anatomic models dedicated for use in training these tasks or that provide standardized ways to evaluate these tasks do not exist. Current anatomical simulation models (e.g., from the Chamberlain Group, Limbs & Things LTD, Pacific Research Laboratories, Inc. (Sawbones®), ProMIS™ Simulator from CAE Healthcare of CAE, Inc., SimSurgery® SEP products, and the like) may simulate a portion of an abdomen, but such models do not provide features associated with these tasks or the necessary standardization required to measure performance parameters over time and populations. In some cases, for example, port locations on traditional laparoscopic models may not be appropriate for robotic surgery. Furthermore, many of the existing models have instrument handles (such as laparoscopic tool handles) rigidly attached to port locations so that robotic trocars or other components cannot be attached to the ports.

The solutions developed thus far have not been specifically targeted to robotic surgery and instead have tried to encompass general surgery, laparoscopic surgery, and to a limited extent robotic surgery. This lack of dedicated robotic surgical training equipment has led to training exercises that are not ideally suited for the unique considerations of robotic surgery. For example, most other systems use a "skin" to lay over large openings in an abdomen model, and port locations must be placed through this large piece of skin. This situation often leads to only a single set of holes and lack of instruction through different choices, setups, etc. Students are not provided the opportunity to try various port placement patterns and to learn the benefits and disadvantages of specific patterns vis-à-vis a particular surgical task to be performed.

During training to use a minimally invasive surgical system, many surgeons and medical personnel initially have difficulty with port placement, robot setup, and cannula docking tasks, and such difficulty may needlessly extend operating times and may even affect a surgeon's willingness to adopt such technology. In addition, personnel associated with training these tasks have identified a lack of proficiency in port placement and cannula docking as the major limiter for useful training outside of a dedicated training facility, such as at a hospital location. What is needed is dedicated training equipment and associated procedures to help surgeons and other medical personnel become proficient in these and related tasks.

SUMMARY

Implementations of the present application relate to anatomical models and surgical training using such a model. In some implementations, an anatomical training model includes a base portion and a top portion that form a hollow space between the base portion and top portion. A plurality of holes are positioned in the top portion. The model includes a plurality of cannula supports, where each cannula support is aligned with one or more corresponding holes in the top portion. For example, each cannula support can be configured to hold a cannula that is positioned through the hole, in simulation of the various locations in a patient's body wall at which cannulas may be placed.

Various implementations of the model are described. In some examples, the plurality of holes are greater in number than required by surgical procedures using the model. At least one of the plurality of holes can have one size to accommodate one size of instrument cannulas, and at least one of the plurality of holes can have a different size to accommodate a different size of instrument cannulas. In some implementations, the cannula supports include at least one cannula support piece positioned below one or more of the corresponding holes and above the bottom portion to simulate a patient body wall for one or more instruments inserted through at least one of the holes in the top portion. In other implementations, each of the cannula supports is positioned in a corresponding one of the plurality of holes in the top portion. For example, each of the cannula supports can include a flexible piece including an annular membrane for holding a cannula inserted through the cannula support and the corresponding hole. Some implementations can include a membrane positioned over the top portion and the plurality of holes.

The base portion of the anatomical model can include a platform providing at least one surgical site to receive one or more instruments inserted in one or more corresponding holes in the top portion. The platform can be removable from the base portion in some implementations. The surgical site can be provided at a known position and orientation on the platform with respect to the plurality of holes to act as a fixed registration location for placement of one or more cannulas in one or more of the plurality of holes. For example, the platform can include structures at different locations of the platform to which the surgical site is operative to be attached, allowing varied positional placement of the at least one surgical site with respect to the plurality of holes in the top portion. The at least one surgical site can include, for example, a component having a soft material simulating tissue for surgical manipulating tasks, and/or a component having a curved pathway and one or more pieces moveable along the curved pathway.

In some implementations, an anatomical training model includes a base portion including a removable platform providing at least one surgical site, and a top portion coupled to the base portion to form a hollow space between the base portion and the top portion. The top portion includes a plurality of holes each sized to receive one or more cannulas directed toward the surgical site. In various implementations, the surgical site can be provided at a known position and orientation on the platform with respect to the plurality of holes to act as a fixed registration location for placement of one or more cannulas in one or more of the plurality of holes. The platform can include structures at different locations of the platform to which the at least one surgical site is operative to be attached, allowing varied positional placement of the surgical site with respect to the plurality of holes in the top portion.

In some implementations, a surgical training method includes measuring one or more parameters associated with one or more tasks, where the one or more tasks are performed with reference to an anatomical model and include at least one of: surgical instrument port placement, surgical robot arm setup, and cannula docking. An automatic comparison is performed between the measured one or more parameters and corresponding one or more stored parameters associated with the one or more tasks, and an evaluation is output that is based on the automatic comparison. In various implementations, the corresponding stored parameters are measured at a first time, and the measuring of the parameters is performed at a second time later than the first time. The parameters measured at the first time can be associated with a first person performing the tasks, and the parameters measured at the second time can be associated with a second person performing the one or more tasks. Alternatively, the parameters measured at the first time and the second time can be associated with a particular person performing the tasks. Outputting an evaluation can include outputting a score that is based on the time needed to perform the one or more tasks, and/or positioning or movement of surgical procedure components during the tasks.

DETAILED DESCRIPTION

The present application discloses features relating to anatomical models used in surgical procedure training exercises, and relating to methods evaluating performances of surgical procedures using an anatomical model. Various disclosed implementations of anatomical models provide and teach realistic positioning, placement, and use of cannula ports and surgical sites for particular surgical procedures. The anatomical model provides a known configuration to be used for surgical training, including positioning cannula ports and surgical sites at known, consistent locations. Implementations provide consistent and repeatable surgical task exercises to allow standardized and consistent measurement, evaluation, and comparison of performances of surgical techniques by many different trainees. Disclosed training methods include measurement and evaluation of surgical exercise tasks such as port placement, robot setup, cannula docking tasks, and surgical task operations, allowing trainees' performances to be evaluated and enabling trainees to improve their skills more efficiently.

Some implementations are described using a robotic surgery system such as a da Vinci® Surgical System (e.g., a Model IS3000, marketed as the da Vinci® Si™ HD™ Surgical System), commercialized by Intuitive Surgical, Inc. of Sunnyvale, Calif. Knowledgeable persons will understand, however, that features disclosed herein may be embodied and implemented in various ways, including robotic and, if applicable, non-robotic embodiments and implementations. Implementations on da Vinci® Surgical Systems (e.g., the Model IS3000; the Model IS2000, commercialized as the da Vinci® S™ HD™ Surgical System) are merely exemplary and are not to be considered as limiting the scope of the inventive aspects disclosed herein.

Figure 1:
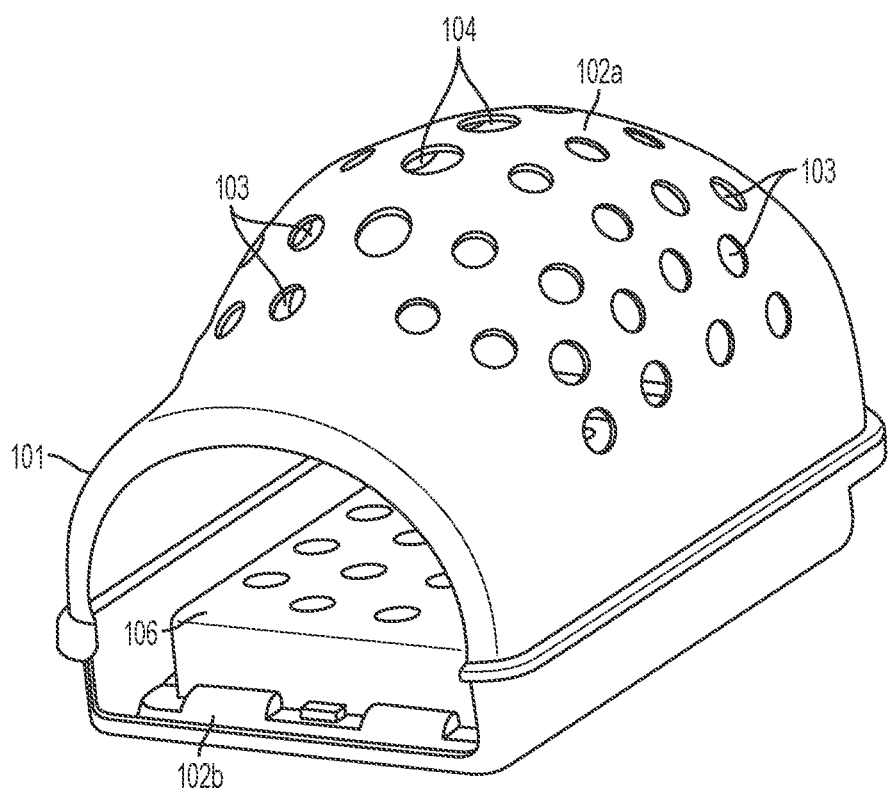
FIG. 1 is a perspective view of an anatomical model.

FIG. 1 is a perspective view of an anatomical model 101 in accordance with some implementations disclosed herein. As shown, the model resembles an insufflated human abdomen and pelvic region. For example, the size and shape of the model 101 can be determined from values in medical literature and cadaver measurements. Various embodiments of model 101 may be sized differently to simulate various body sizes (e.g., pediatric, small female, average, large male, obese, etc.).

The model includes a top portion 102a and a base portion 102b, which fit together and form an outer shell of the model. The model has a hollow interior between top portion 102a and base portion 102b. Alternatively, the outer shell of the model is formed from a single piece, or from three or more pieces.

Several port placement openings are formed in the top portion 102a of the model, and these openings allow one or more cannulas to be positioned in the model at various port locations. As shown in the example embodiment of FIG. 1, the openings can include one or more sets of holes in top portion 102a to allow operating instrument cannulas to pass therethrough and directed instruments toward a surgical site inside the anatomical model 101. In this example, one set of holes 103 is positioned in top portion 102a to accommodate cannulas for surgical instruments that are operating instruments, e.g., instruments used to contact and manipulate a simulated surgical site within the model. For example, operating instruments can include conventional laproscoping instruments and/or instruments having manipulable needle driver, stapler, scalpel, vessel sealer, scissors, forceps, grasping implements, cauterizing tools, irrigation tools, suction tools, etc. A second set of holes 104 are also positioned in top portion 102a to accommodate cannulas for surgical instruments that are endoscopes or other camera instruments, e.g., instruments providing a camera and/or illumination to provide images of the surgical site to the surgeon or trainee. In some implementations, smaller camera instruments can be positioned through the smaller holes 103.

In this example, holes 104 can be positioned along a longitudinal centerline of the top portion 102a, in accordance with an aspect of a camera port placement technique that similarly positions the camera instrument port generally at a patient's abdominal centerline. In other embodiments, holes 104 may be at other locations in the model. As shown, holes 103 are positioned in top portion 102a laterally of the model's longitudinal centerline. Holes 103 simulate the various locations at which operating instrument cannulas can be placed.

The various holes are placed to allow a trainee to place surgical instrument ports in the model in accordance with recommended surgical instrument port placement for various robotic surgery procedures, such as radical prostatectomy, radical hysterectomy, partial nephrectomy, multi- or single-port cholecystectomy, etc. In some embodiments, one or more holes 103 and/or 104 are placed in base portion 102b to simulate access to a surgical site from a direction that originates at base portion 102b. The holes 103,104 can be placed at various locations in various embodiments to accommodate the learning objective or objectives to be supported by the use of the particular model embodiment. In various implementations, the density and/or number of holes in top portion 102a can vary to allow for more or fewer port location options.

In some implementations such as the embodiment shown, there can be a greater number of holes 103,104 provided in the top portion 102a than are required for a surgical procedure (or any surgical procedures intended to be practiced using the model), so that a trainee is required to select the proper subset of holes to use in order to reach a surgical site inside the simulated patient. Thus, various port placements can be explored for a certain surgical task. In this way a surgeon can more fully understand the relative advantages and disadvantages of one port placement strategy versus another port placement strategy for a certain surgical task.

Furthermore, the anatomical model 101 provides an array of holes 103 and 104 which can be specifically-tailored in their positions to surgical instruments of a particular robotic surgical system, allowing training to be provided for a robotic system using an array of port locations.

A simulated surgical site platform 106 can be positioned inside the model's hollow interior. As explained in more detail below, platform 106, or objects placed on platform 106, may have various configurations to simulate various surgical procedures at various positions inside the model. In this way, the single model 101 can be used for surgical port training for various different surgical procedures.

The anatomical model 101 can also be useful for a range of other surgical task exercises. For example, the model can be used for remote center alignment of instruments with the abdomen body wall, instrument exchange, camera and instrument insertion under direct vision, other training activities related to patient side skills (suture exchange using a laparoscopic tool, retraction using a laparoscopic tool by an assistant, etc.), understanding and illustration of workspace limits by the surgical instruments, setup conditions to avoid collisions of external robot arms, etc.

Figure 2A:
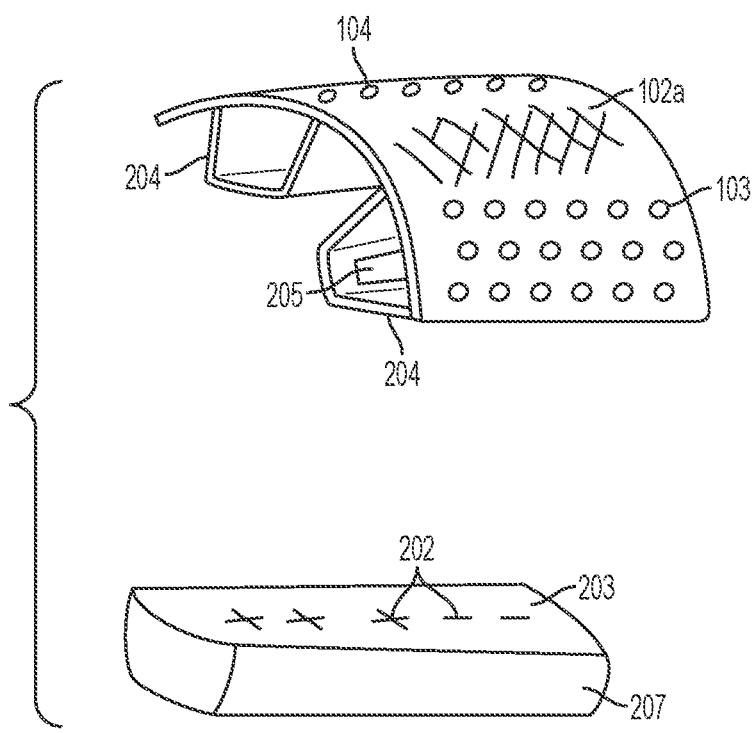
FIGS. 2A and 2B are a diagrammatic perspective views that illustrates surgical ports and associated cannula supports in an anatomical model.

FIG. 2A is a diagrammatic perspective view that illustrates surgical ports in the model and associated cannula supports. In this example, a cannula support piece 201 is placed below and aligned with a set of the holes 103, 104 to simulate the patient's body wall. When a cannula is inserted through a hole 103 or 104 and the associated piece 201, the piece 201 acts as a support for the cannula and holds the cannula in a manner similar to the way a patient's body wall supports a cannula (e.g., a little floppy). By simulating the way a cannula is supported by a patient's body wall, medical personnel may be trained in a realistic situation to position, align, and dock a surgical robot manipulator to an associated cannula.

In some examples, piece 201 may be made of various materials such as foam or rubber (e.g., polyurethane). Different materials having different properties (e.g., stiffness) may be used to simulate different body wall characteristics at corresponding locations on the model. For example, one material may be used to simulate the umbilicus, and a second material may be used to simulate the anterior abdominal muscles. In some implementations, piece 201 is sized to have thickness to simulate the patient's body wall thickness. A relatively thicker piece 201 may be used in a relatively larger model 101 to simulate a relatively larger patient, whereas a relatively thinner piece 201 may be used in a relatively smaller model 101 to simulate a relatively smaller patient. In a single anatomical model, cannula support thicknesses may be varied for one or more associated holes 103 to simulate different body wall characteristics (e.g., umbilicus vis-à-vis abdominal muscle).

Piece 201 may be supplied without any perforations, so that piece 201 must be pierced to insert a cannula. Alternatively, the piece 201 may be supplied with one or more preformed openings 202 through which the cannulas can be placed. The preformed openings 202 allow piece 201 to be reusable. As shown in FIG. 2A, in some embodiments the preformed openings 202 may be single slit or cross slit implementations. Alternatively, other openings such as circular shapes of one or more diameters may be used. In some implementations, such as implementations in foam, a thin protective plastic layer may be placed on top surface 203 of piece 201 in order to increase its service life during training.

As illustrated in FIG. 2A, in some embodiments the anatomical model is configured to allow cannula support piece 201 to be removable from the top portion of the model. As shown, a piece 201 can be inserted into a support bracket 204 that underlies, for example, holes 103 or 104. A piece 201 can be cut to the shape of a support bracket 204, for example. In some implementations, a piece 201 can be disposable after one or more uses. The support brackets 204 underlying particular sets of holes may be identically sized, so that a piece 201 may be inserted into one of two or more brackets 204. Alternatively, two or more brackets 204 may be differently sized, so that a different cannula support piece 201 is required for different corresponding sets of holes. In other embodiments, a support piece 201 may be permanently attached under a set of holes. In some embodiments one or more support brackets 204 may have one or more openings 205 that allow a cannula or an instrument to extend through the support piece 201 and into the interior space within the model. In other embodiments, one or more support brackets 204 are solid, so that a cannula or instrument cannot extend beyond the support bracket.

In some model 101 embodiments, different cannula support types are used for different sets of holes. For example, one cannula support type is used for a set of holes used for endoscope insertion, and a second cannula support type is used for a set of holes used for tissue instrument insertion. In one example implementation, a foam type cannula support is used in association with holes 104, and a different cannula support type is used in association with holes 103.

Figure 2B:
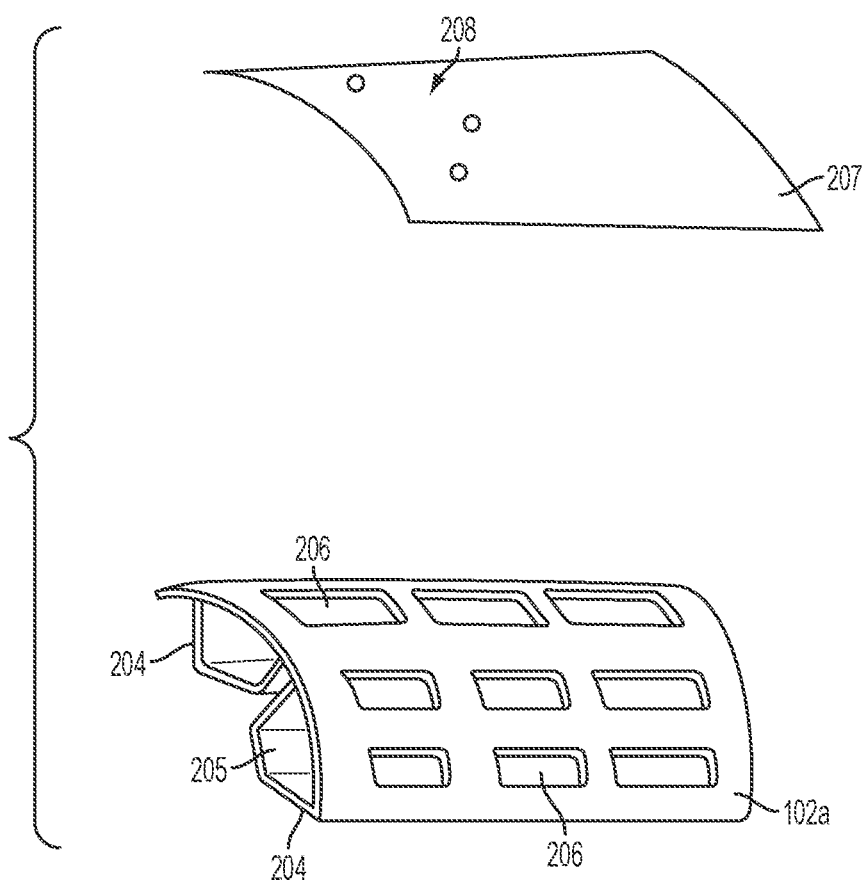

FIG. 2B illustrates a second embodiment of the anatomical model and associated cannula supports. As shown in FIG. 2B, top portion 102a is configured with a plurality of window openings 206 that are relatively larger than holes 103 or 104. Each cannula support piece can be inserted in a corresponding support bracket 204 below the surface of top portion 102a and underneath holes 103 and 104, similarly as described above for FIG. 2A. A benefit of such relatively larger window openings 206 is that they allow a relatively more free port placement than embodiments in which port placement is constrained by the specific locations of the holes 103 or 104. In some embodiments, a thin membrane 207 (shown above the top portion 102a in an exploded view) is placed over the openings to simulate skin on the model. A pattern of port locations 208 may be marked on membrane 207, each location being over an opening 206. Various different membranes 207 may have various different port location patterns 208 (e.g., one pattern per membrane, or two or more patterns per membrane) to act as port placement guides for various different surgical procedures. Such membranes 207 may also include anatomical landmarks along with the port placement guides to illustrate spatial relationships between the ports and the landmarks. In some embodiments, a membrane 207 is used together with an anatomical model having the relatively smaller cannula port placement holes, such as holes 103 and 104.

Figure 3A:
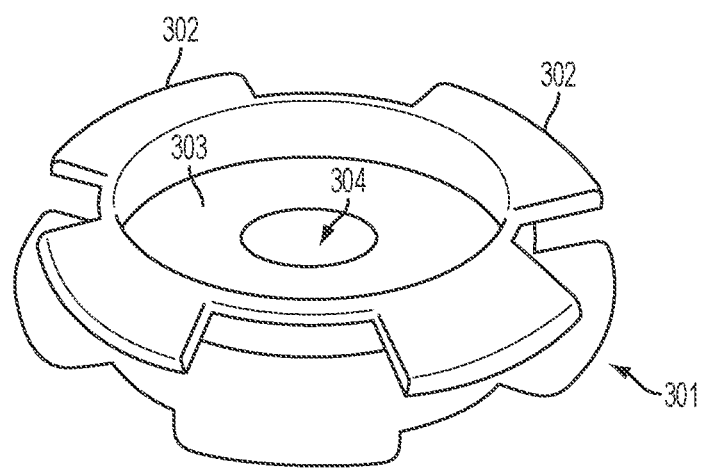
FIG. 3A is a perspective view of a cannula support.

FIG. 3A is a perspective view of another example embodiment of a cannula support that may be used in the anatomical model. In one implementation of the anatomical model, a cannula support 301 is aligned with and placed in each hole 103.

In the depicted implementation, cannula support 301 is a flexible piece (e.g., rubber) sized to fit into holes 103 in the model. Support 301 includes grips 302 around the outer perimeter to prevent or reduce dislodgement of the support from its associated hole 103. The support 301 includes an annular inner membrane 303 that covers a portion of a hole 103, and a hole 304 in the center of the membrane 303. A cannula is inserted through hole 304, and a friction fit between the inserted cannula and the membrane supports the cannula. As described above, a cannula inserted through support 301 is a little floppy, which provides realistic simulation and associated training benefits. Support 301's dimensions (e.g., thickness) and material characteristics (e.g., stiffness) may be varied to produce a simulation of different cannula support characteristics at various anatomical positions as described above.

To assist in training, similar cannula supports 301 may be distinguished from one another by various characteristics, such as markings (e.g., letters, numbers, and the like) or colors. Supports 301 having a particular identifying characteristic are placed in certain holes to aid instruction in proper port locations for particular scenarios. For example, in an array of black colored supports 301 in holes 103, red colored supports 301 may be placed in a first pattern of holes 103 that correspond to proper port placement for a prostatectomy, or the red colored supports 301 may be placed in a second pattern of holes 103 that correspond to proper port placement for a partial nephrectomy.

Figure 3B:
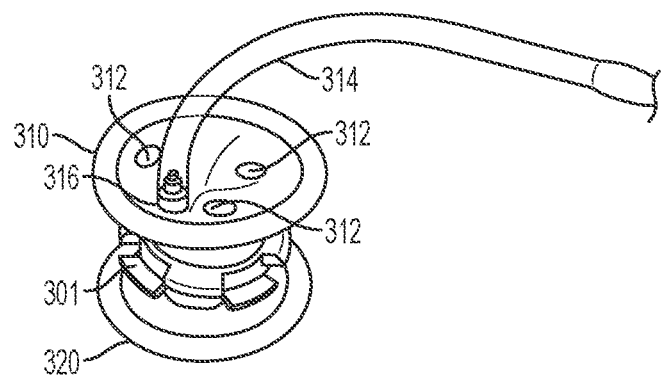
FIGS. 3B and 3C are perspective views of a cannula support and single site port.
Figure 3C:
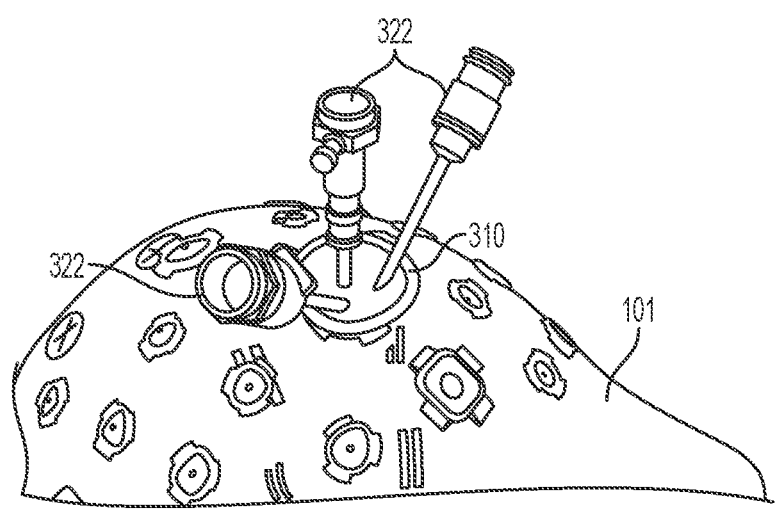

FIG. 3B is a perspective view of another embodiment including a cannula support 301 and single site piece 310 that may be used with the anatomical model. Cannula support 301 can be similarly implemented as described above for FIG. 3A, which can be designed to accommodate a single site piece 310. Single site piece 310 can be a supplemental piece used for guiding multiple cannulas or instruments through a single hole 103 or 104. For example, single site piece 310 can be a flexible (e.g., rubber or similar material) cup-shaped piece as shown in FIG. 3B including multiple holes 312, each hole for guiding a cannula or instrument, such as a curved cannula 314 inserted in hole 316. In some implementations, the single site piece 310 can also include an interior cup portion 320 for securing the single site piece 310 to the anatomical model and/or further guiding the cannulas or instruments. FIG. 3C is a perspective view of an example of three cannulas 322 (disconnected from instruments and manipulators in this example) inserted through a single hole of the anatomical model 101 using a single site piece 310.

It should be noted that although anatomical model 101 is generally described as a shell having a hollow interior, with one or more cannula supports being positioned in relation to the shell so as to support one or more cannulas inserted through the shell, in some embodiments an anatomical model may be made without a hollow interior so that the model provides the cannula support function but not the surgical site simulation function. For example, foam or other material may fill the anatomical model's interior. Or, the model may be made of a single, solid piece, such as molded plastic or wood. In such embodiments, a support piece 201 may be inserted into a corresponding opening in the anatomical model, which acts as a support bracket 204, or other cannula supports such as supports 301 may be positioned on an outer surface of the model with sufficient underlying space to allow a cannula to be inserted into and held by the cannula support.

Figure 4:
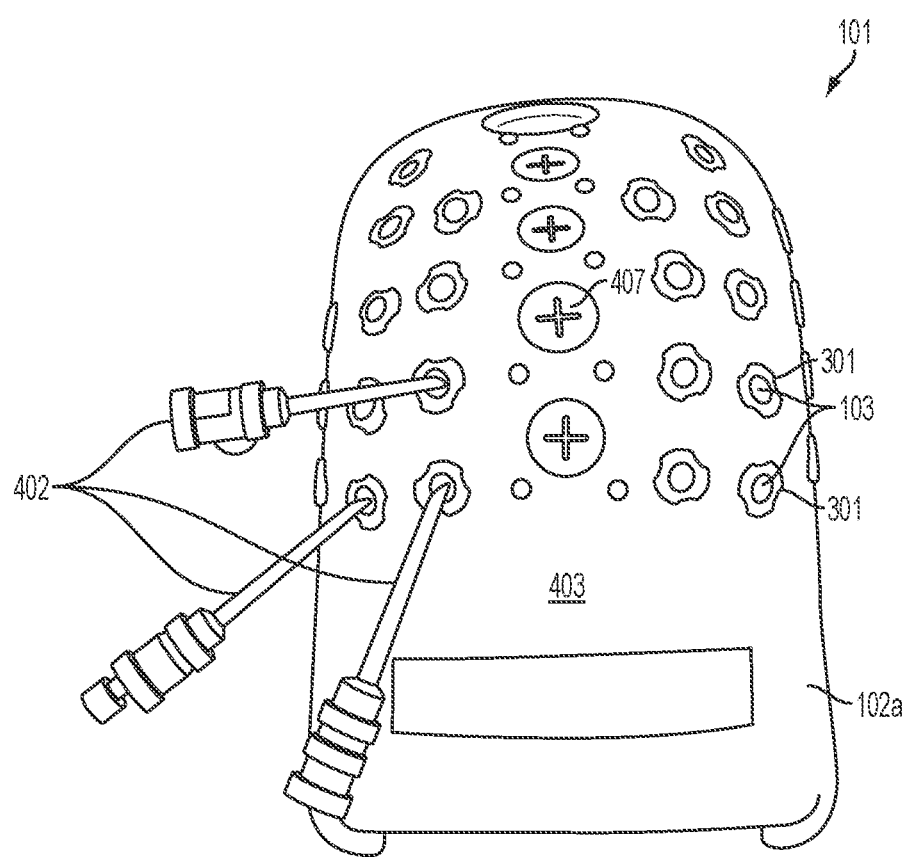
FIG. 4 is top perspective view of an anatomical model.

FIG. 4. is a top perspective view of an embodiment of the anatomical model 101. As shown, top portion 102a includes several holes 103, and each hole 103 has a support 301 inserted in it. Top portion 102a also includes several holes 104, and a portion of a foam piece is placed under and cover each hole 104. In the depicted embodiment, one or more foam pieces similar to piece 201 described above are permanently mounted under each hole 104 (e.g., with screws, as shown), and a protective plastic covering 407 is used with preformed cross slits visible over each foam piece. Thus, the embodiment shown in FIG. 4 is reusable. Three illustrative operating instrument cannulas 402 are shown placed in associated supports 301 in holes 103. Although not shown, a camera instrument cannula may be similarly placed in the foam support at a hole 104. A relatively larger hole 104 (not shown) can in some implementations be placed in top portion 102a (e.g., at a location simulating the umbilicus) to allow training for single port access to a surgical site. In some examples, the introduction of curved cannulas and the required mounting to an associated robotic manipulator can be tasks that may require training as provided by anatomical model 101 and methods described herein.

In some implementations of the anatomical model 101, a top surface 403 of top portion 102a can include one or more marked target locations which can act as simulated anatomy locations of a patient. In some implementations, top surface 403 of top portion 102a is formed to allow such markings to be erasably made (e.g., using grease pencil, white board marker, etc.). Such markings allow a training person to draw on or mark the top portion 102a to assist training and to help medical personnel understand port placement philosophy, such as to mark port relationship relative to one another (e.g., operating instrument port spacing from camera instrument port) for various different surgical procedures. An overlying membrane, such a membrane 207 (FIG. 2B) may be similarly made to allow such erasable marking. In other implementations, the marked locations are fixedly made to the top surface for standard surgical procedures that are commonly trained using the model 101.

In training exercises, the marked locations can be used to determine which holes 103 and 104 should be used with reference to the marked target locations. In some example implementations of trainee selection of proper port holes, a location can be marked to simulate a location of a standard pelvic anatomy feature of a patient, and the trainee then can be required to determine which of the holes 103 and 104 are to be used for cannulas in a particular surgical procedure on that pelvic location. In one example of particular port placements, proper placement of a camera instrument port should be 10-20 cm away from the target location, operating instrument ports should be 8-10 cm from the camera port and other operating instrument ports, and an accessory port should be at least 5 cm away from other ports. Similarly, another location on top portion 102a can be marked for an enlarged pelvic anatomy, another location can be marked for a lateral quadrant anatomy, etc. A trainee's performance in properly selecting and placing the cannula ports can be measured, as in the training procedures described below.

In some implementations, at least a portion of the outer shell of anatomical model 101 is made transparent to allow a person being trained to view a target surgical site within the model's hollow interior and the relation between the target surgical site the cannula port placements and robot manipulator positions that are required to properly reach the target surgical site. For example, top portion 102a may be made of a clear plastic material. Likewise, an overlying membrane such as membrane 207 (FIG. 2) may be made transparent for a similar purpose.

Figure 5:
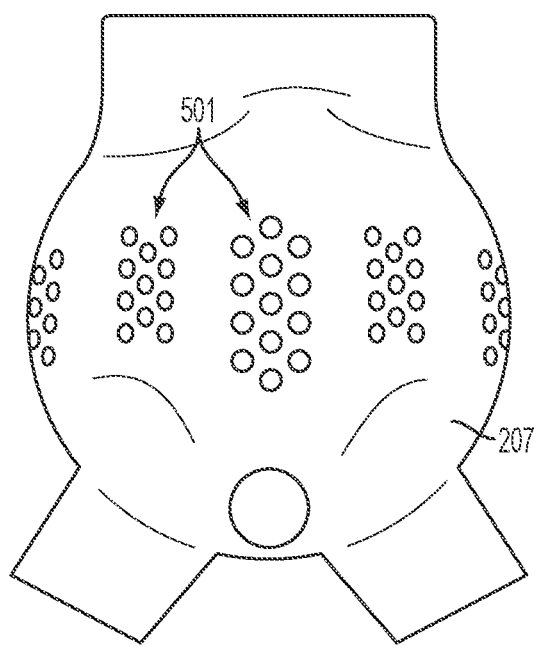
FIG. 5 is a diagrammatic top view of port placement grids.

FIG. 5 is a diagrammatic top view of possible port placement grids 501 for an overlying membrane. In some implementations, one or more grids 501 are placed on a thin membrane 207 that covers top portion 102a of the model. The membrane 207 covers the holes 103,104 (alternatively, window openings 206), and so allows a person being trained to identify proper port placement in an appropriate hole (or one or more holes) of the one or more grids 501. In some embodiments, the membrane includes one or more anatomical features, such as the umbilicus, costal margins, or the xyphoid process, and these anatomical features provide anatomical references that help medical persons understand port placement. Similar anatomical feature markings may be placed directly on the top surface 403 of the anatomical model. Such features allow a more realistic simulation of a patient. Membrane 207 may be marked as a surgeon would mark a patient when determining port placement during actual surgery. When port locations are selected on membrane 207, the membrane can be pierced and cannulas inserted though the nearest underlying holes 103,104 or through windows 206.

Figure 6:
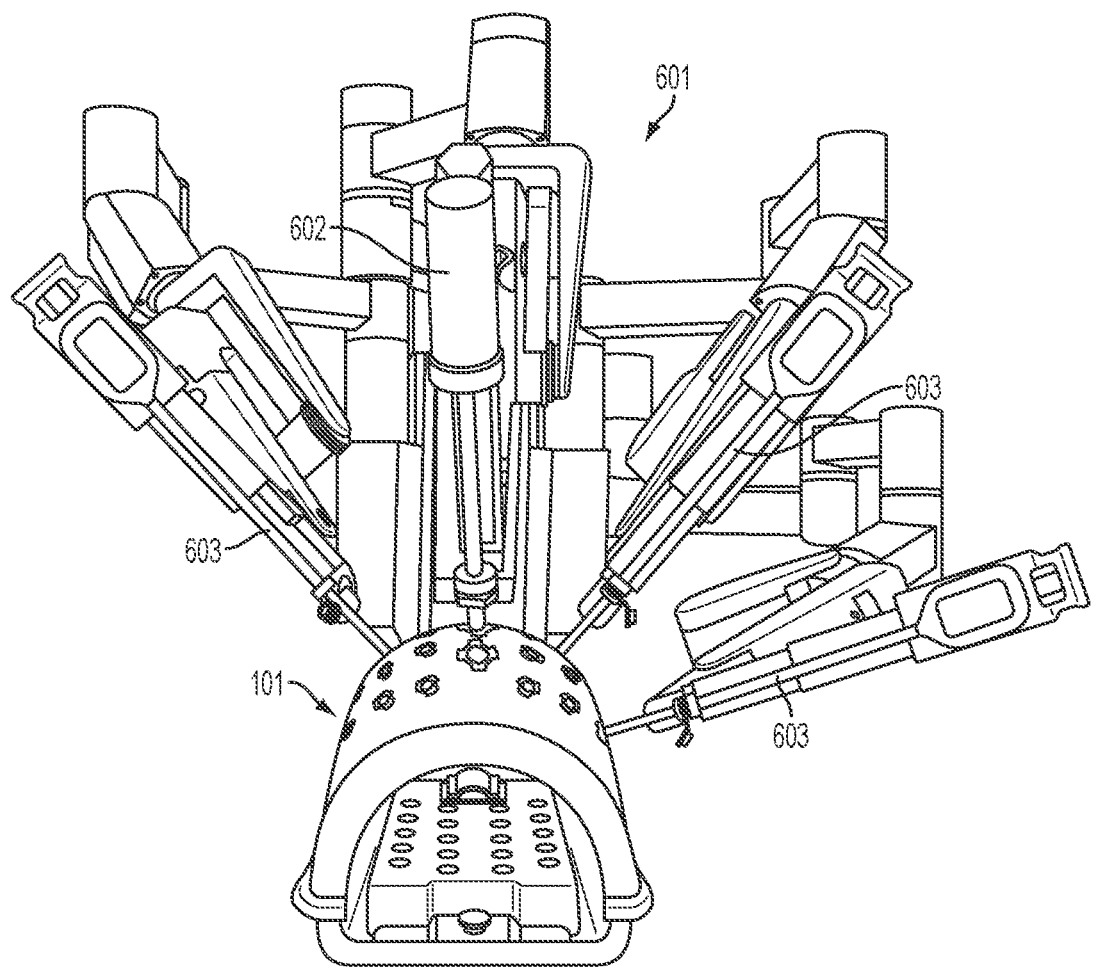
FIG. 6 is a perspective view of a surgical robot with an anatomical model.

Once cannulas are in place in a patient body wall, a surgical robotic manipulator can be coupled ("docked") to each cannula, so that the manipulator controls both the cannula and an instrument that extends through the cannula and into the patient to reach the surgical site. FIG. 6 is a perspective view of an exemplary surgical robot 601 with each manipulator (one for a camera instrument and three for operation instruments, as shown) coupled to an associated cannula in the anatomical model. A camera instrument 602 can be positioned through a cannula in a centerline hole 104, and the operation instruments 603 are positioned through cannulas in holes 103, one on one side of the model and two on the other side of the model (one is partially hidden). To enhance the simulation of working on a patient in a surgical operating room environment, model 101 is placed on an operating table 604 at a location corresponding to a patient's position on the table. Different surgical procedures require various different port placements, and so a person being trained may have to position the robot 601 in one location for one procedure (e.g., at the foot of the operating table as shown, simulating a location between the patient's legs) and in a second location for another procedure (e.g., beside the operating table). In some implementations, anatomical model 101 may include additional anatomical features, such as appendages or portions thereof (e.g., legs, arms), other anatomical areas (e.g., head and neck, upper torso), and natural orifices (e.g., mouth, anus, vagina) to help a person being trained understand how patient position and orientation, table position and orientation, cannula placement requirements, target surgical site location(s), and robotic manipulator position and orientation are interrelated in order to provide the most effective access to a desired surgical site.

In some examples of surgical robotic systems, a trainee surgeon can teleoperate the surgical instruments 602 and 603 from a separate console (not shown) that includes various controls providing signals to the surgical robot 601 to allow manipulation of the instruments in various ways. For example, various actuators in robot 601 and controlled by the console signals can drive movement of the instruments to perform surgical tasks. Other control systems can be used in various implementations.

Figure 7:
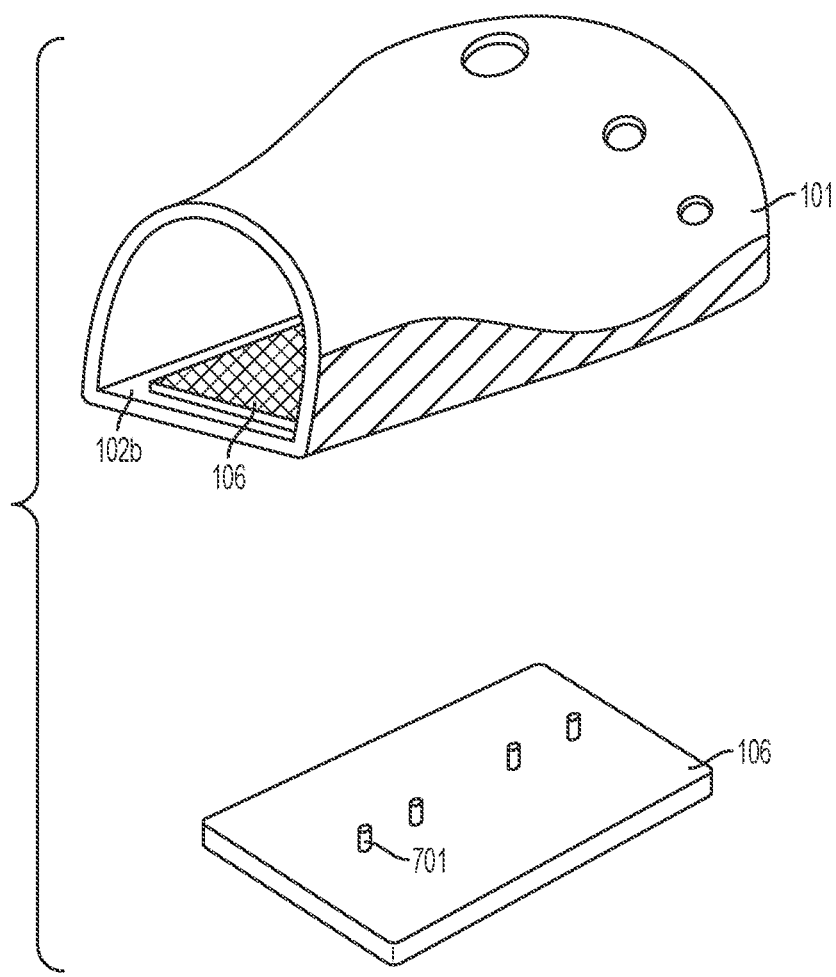
FIG. 7 is a perspective view of one example of a surgical exercise task platform.

FIG. 7 is a perspective view that shows platform 106 in more detail, and how platform 106 is positioned within the hollow interior space of anatomical model 101. In one aspect, various platform 106 embodiments are made, each embodiment corresponding to one or more different surgical procedures at different simulated surgical site locations. For example, one platform 106 embodiment may have a simulated surgical site located relatively more cranially than another platform 106 embodiment having a simulated surgical site located relatively more caudally. Two or more simulated surgical sites may be located on a single platform 106 to simulate situations in which cannulas must be positioned to provide effective endoscopic camera and tissue instrument access to the two or more sites, or to demonstrate that in certain circumstances one set of cannula positions is required to effectively access one surgical site, and a second set of cannula positions is required to effectively access a second surgical site. In some circumstances, physical limitations of the instruments and/or associated robot manipulators may indicate that one set of cannula positions required to access one surgical site at a first anatomical location (e.g., lymph nodes in the lower abdomen), and a second set of cannula positions is required to access a second surgical site at a second anatomical location (e.g., lymph nodes in the upper abdomen). Consequently, in such circumstances the robot manipulators must be decoupled ("undocked") from cannulas in the first setoff positions, cannulas are then inserted in the second set of positioned, and the robot manipulators are then docked to the cannulas in the second set of positions.

Platform 106 embodiments may also be configured to place a simulated surgical site at various depths within the model so as to simulate working relatively near the body wall through which the cannulas are inserted (e.g., anterior access to anteriorly located tissue) or relatively far away from the body wall through which the cannulas are inserted (e.g., anterior access to posteriorly located tissue).

A platform 106 can be removably placed within a fixture (not shown in FIG. 7) in base 102*b*, and the fixture acts as a fixed registration location for the associated required port placement. Thus when a platform is selected and positioned in the model, the platform is located at a constant position. Thus the model positions surgical task exercises in the same location inside the abdomen model across surgeons or between training sessions to enable consistent and repeatable comparison of trainee performance, and persons being trained can be evaluated to ensure that port placements they select are effective for the type of surgical procedure being simulated by the selected platform.

Figure 8:
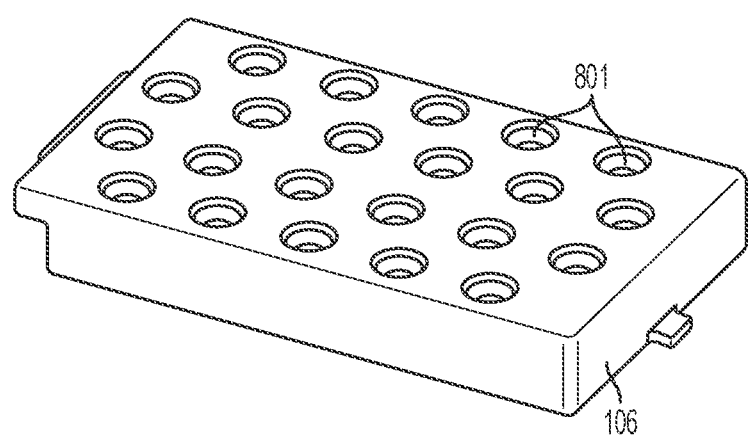
FIG. 8 is a perspective view of another example of a surgical exercise task platform.

As shown in FIGS. 7 and 8, various platform 106 embodiments can each be configured to simulate a surgical site. As shown in FIG. 7, for example, platform 106 may be configured with one or more structures at various locations, such as pegs 701. FIG. 8 is a perspective view of a platform 106 embodiment that is configured with several openings 801 that can accommodate surgical task training components at various positions and/or orientations on a platform 106. A simulated surgical task can be carried out by placing one or more objects (e.g., small rings) in relation to the structures or openings, such that the structures or openings can act as templates for exercises. In another aspect, a common platform 106 is configured to accommodate various removable components that simulate a surgical site. In these aspects, one or more structures or openings (e.g., pegs 701, openings 801, or holder 902 (FIG. 9)) are used to consistently position removable surgical site simulation components on platform 106 and thus consistently position the components in model 101.

Figure 9:
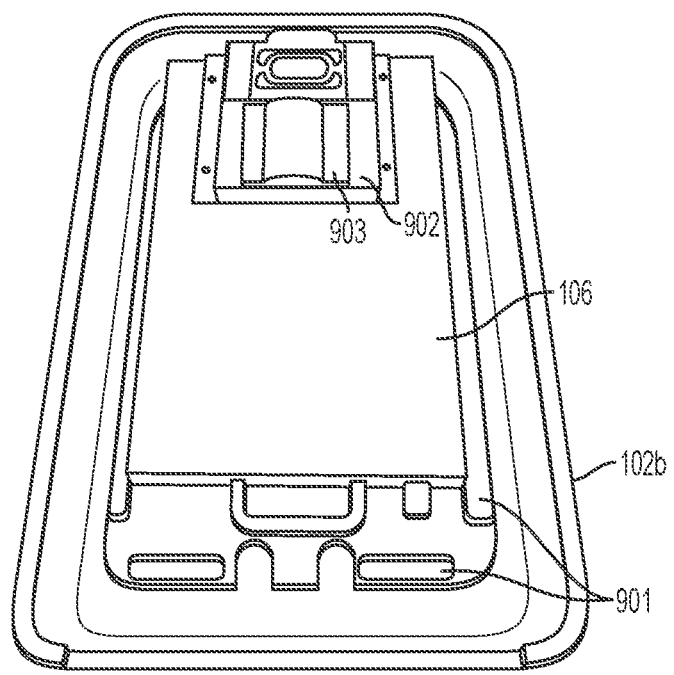
FIG. 9 is a perspective view of one example of an anatomical model base portion and a surgical exercise task platform.

FIG. 9 is a perspective view of base portion 102*b* with platform 106 mounted. Platform 106 is aligned in base portion 102*b* by positioning it inside alignment guides 901. A surgical task exercise holder 902 is fixed to platform 106 or may be an integrated part of platform 106. Various surgical task exercise holder 902 embodiments exist, such as guide rails (as shown), releasable fasteners (e.g., hook and loop (Velcro®) fasteners, 3M Company's Dual Lock™ fasteners), magnets, re-adherable adhesives, and the like). Various surgical task exercise components 903 may be inserted into and held by holder 902 at a known, constant position and orientation, so that exercises are consistently registered by location within the anatomical model.

Embodiments of surgical task exercise holders may include two or more components, such as one component coupled to platform 106 and a second component coupled to the first component. A second surgical task exercise holder component slides between and is held in place by the rails of the first component which is the exercise holder 902 of FIG. 9. A surgical task exercise holder 902 can hold one or more various surgical task exercise components. Such surgical task exercise components may be permanently coupled to an associated exercise holder, or they may be removably coupled to an associated exercise holder in a manner similar to the way an exercise holder may be removably coupled to platform 106.

Figure 10:
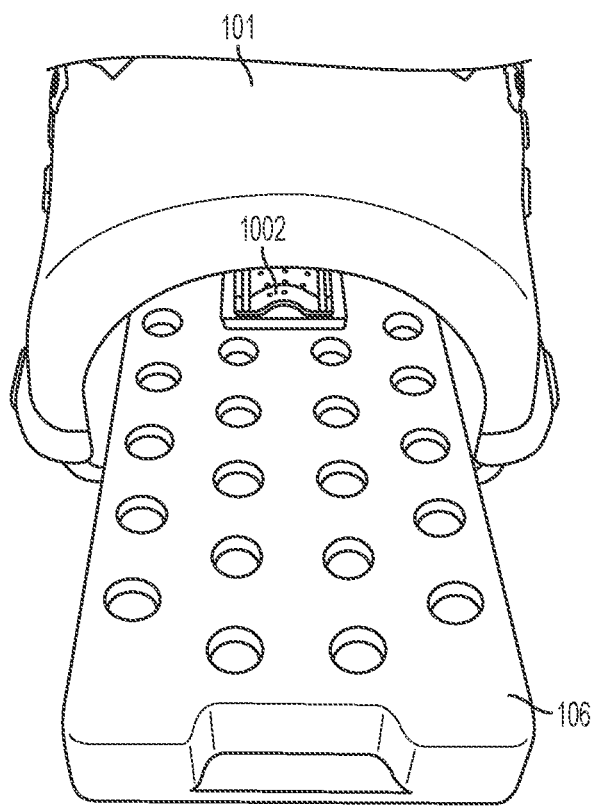
FIG. 10 is a perspective view of another example of the anatomical model and a platform similar to the platform of FIG. 8.

FIG. 10 is a perspective view of another example embodiment of the anatomical model 101 and a platform 106 similar to the embodiment shown in FIG. 8. Platform 106 includes a surgical site component 1002 positioned at one end. The platform 106 can be inserted into an open end of the anatomical model 101 as shown. For example, the platform 106 can be slid until secured in a known position within the anatomical model 101.

Figure 11:
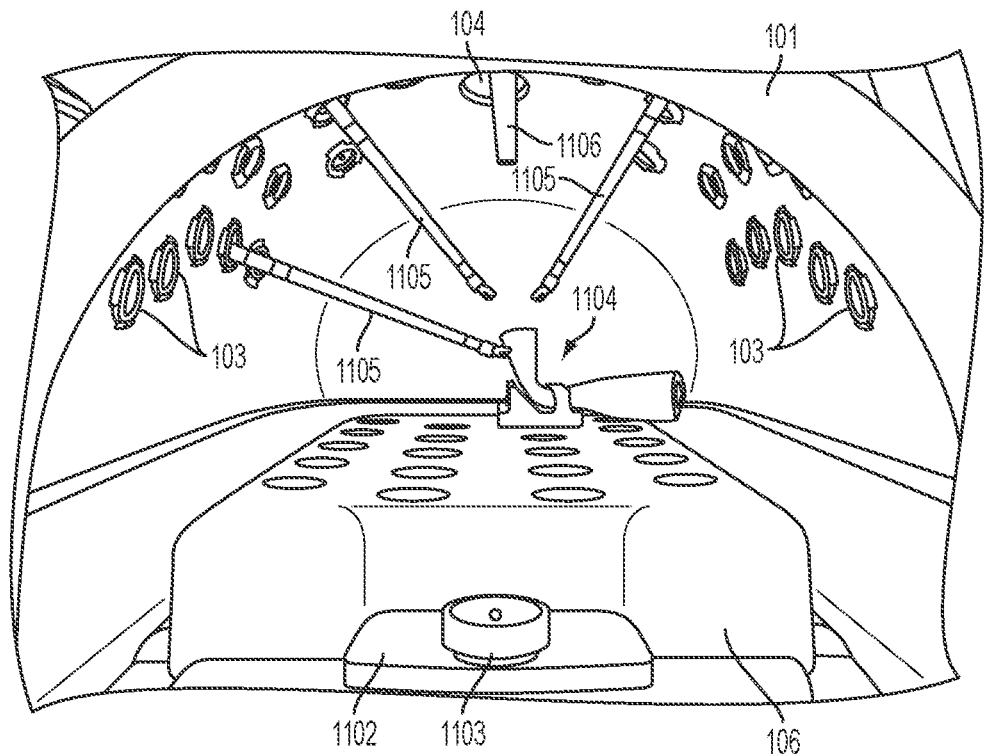
FIG. 11 is a perspective view of an interior of one embodiment of an anatomical model.

FIG. 11 is a perspective view of an example interior of one embodiment of an anatomical model 101. A platform 106 similar to the one shown in FIG. 10 has been inserted and has been secured in a known position with the interior, thus placing the platform in a known position relative to the holes 103 and 104 in the top portion of the model 101. In some implementations, the platform 106 can be secured in the known position by a plate 1102 that slides into a locking position and is secured in that position by a fastener, such as knob 1103 which can be screwed in placed by a trainee. A simulated surgical site including component 1104 is provided on one end of the platform 106 and is referenced relative to three operating instruments 1105 that have been inserted through holes 103 and a camera instrument 1106 that has been inserted through a hole 104. A trainee can control operating instruments 1105 to manipulate the surgical site component 1104 similarly to a real surgical site in a patient.

Figure 12:
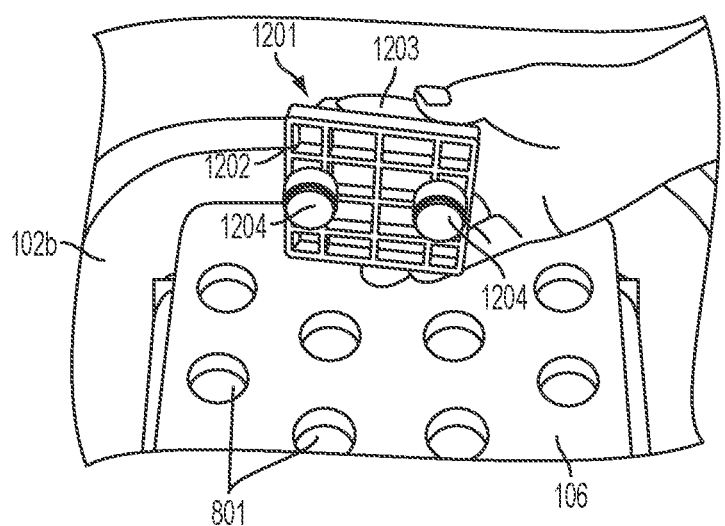
FIG. 12 is a perspective view of one example of an illustrative task exercise component for a platform similar to the platform of FIG. 8.

FIG. 12 is a perspective view of one example of an illustrative task exercise component for a platform 106 similar to the platform 106 of FIG. 8. Platform 106 of FIG. 12 includes multiple openings 801 which are spaced apart by a predetermined distance in multiple directions. An exercise component 1201 can include a component base 1202 that holds the surgical site component 1203 on a top side, and also includes a number of pegs 1204 on a bottom side of the base 1202. The pegs 1204 are spaced to fit in the openings 801 of the platform 106. In this way, the exercise component 1201 can be positioned in any of a variety of known locations on the platform 106. Each of these locations is a known location with respect to the holes 103 and 104. The selected position on the platform 106 for the component 1201 can be input to the robotic surgery system, for example. The exercise component 1201 can be any of a variety of types of components as described below.

Figure 13A:
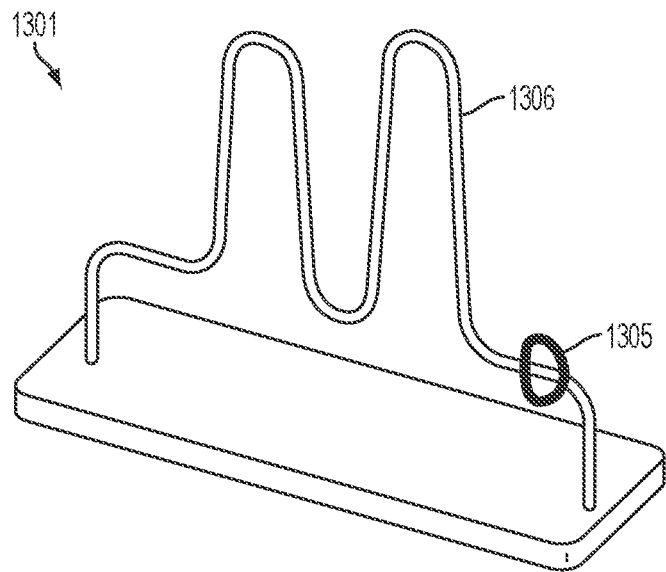
FIGS. 13A to 13H show example illustrative task exercise components which can be used for the platform in the anatomical model.
Figure 13B:
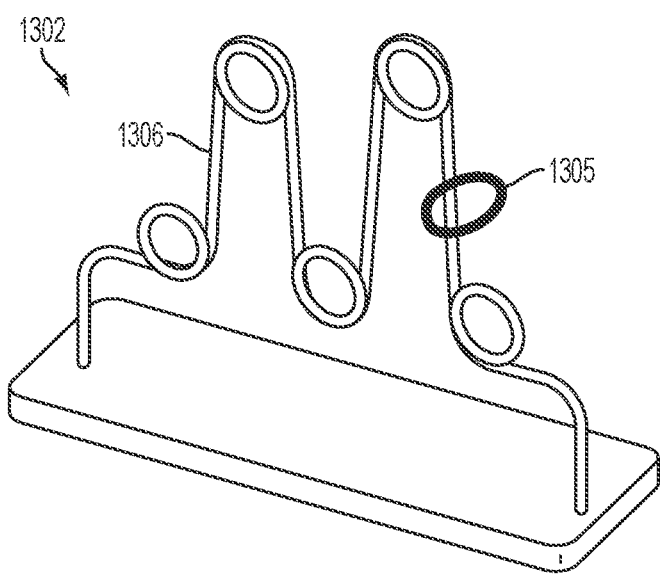
Figure 13C:
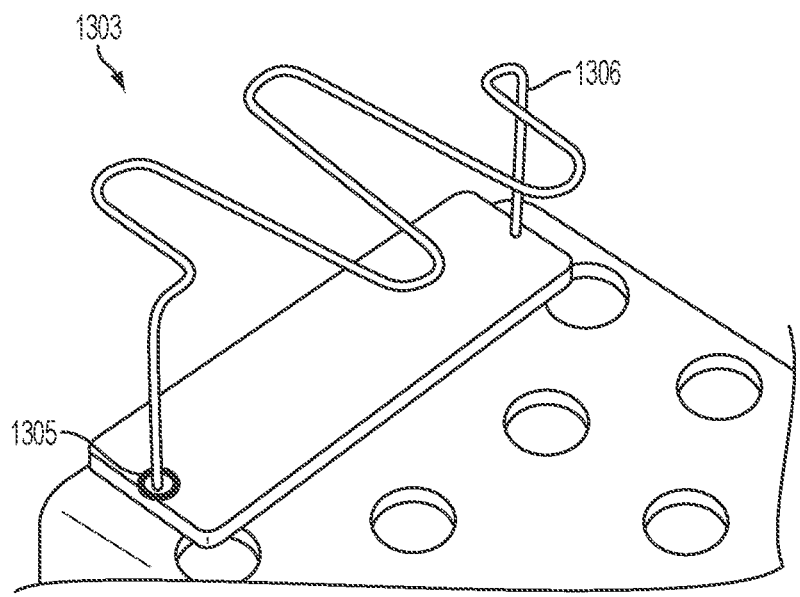
Figure 13D:
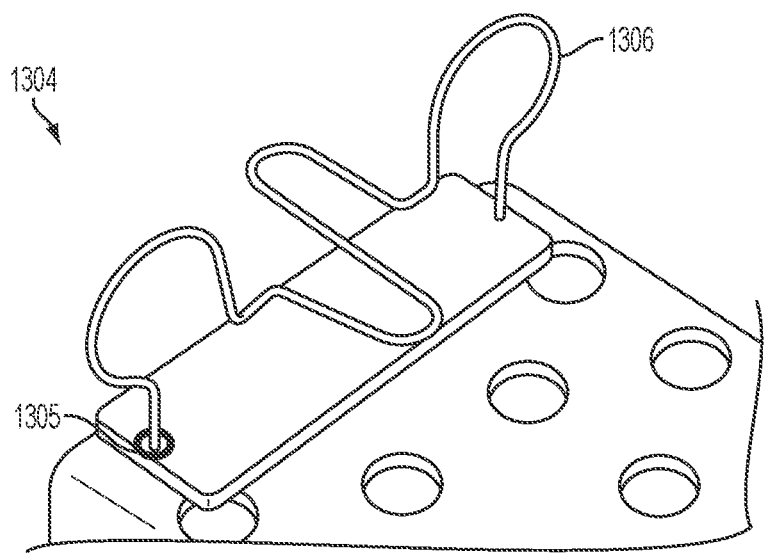
Figure 13E:
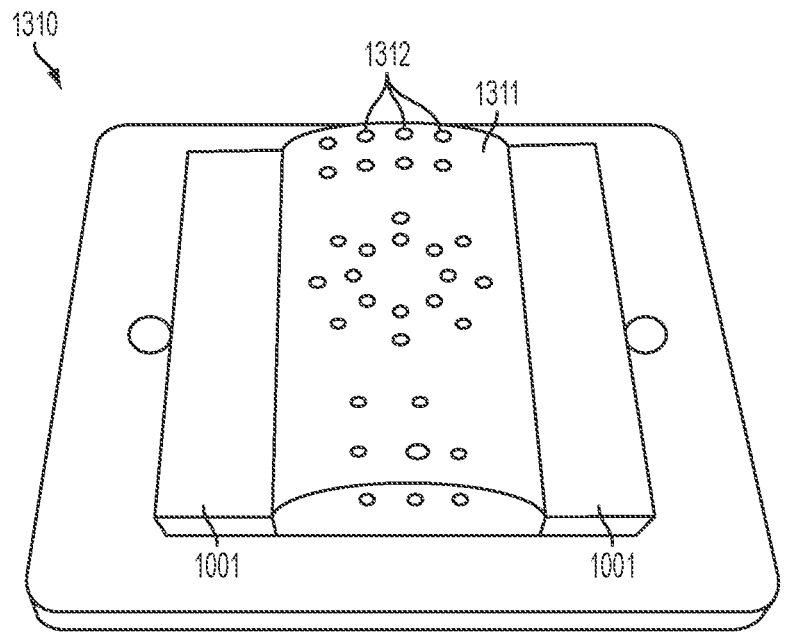

FIGS. 13A to 13H show several illustrative task exercise components which can be used for platform 106, e.g., as exercise component 903 of FIG. 9 or any of the surgical site exercise components of FIGS. 10-12. For example, each task exercise component can be removably mounted on holder 902 of FIG. 9 by, for example, sliding under mounting rails 1001 of the component 1310 as shown in FIG. 13E. Alternatively, each task exercise component can be provided on a component base 1202 and inserted in openings 801 of platform 106 as shown in FIG. 12.

Exercise component 1301 of FIG. 13A, component 1302 of FIG. 13B, component 1303 of FIG. 13C, and component 1304 of FIG. 13D involve moving small pieces such as rings or beads 1305 along a curved pathway, such as a curved wire 1306. These curved pathways 1306 can be oriented vertically (as in components 1301 and 1302), primarily horizontally (as in component 1303), or a combination of these orientations (as in component 1304). For example, forceps or claws on the tips of operating instruments can be used to grasp the pieces 1305 and move them. In some implementations, features such as the loops in component 1302 can require hand-off by a trainee between two instruments, such as left hand and right hand instruments.

Figure 13F:
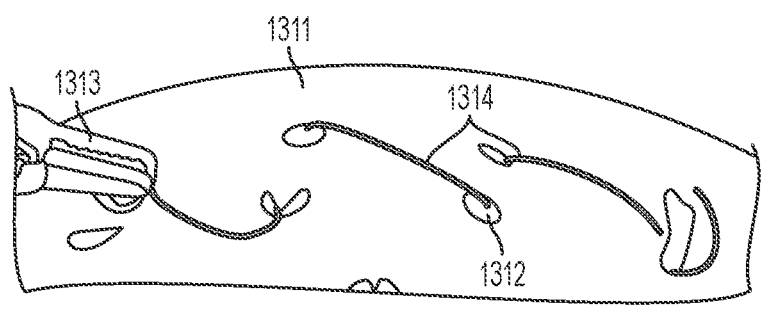

Exercise component 1310 of FIG. 13E can be a portion of soft material (e.g., foam) to simulate tissue for manipulation tasks. For example, component 1310 can be a piece 1311 of foam having multiple holes 1312. In some surgical tasks, the trainee can be required to insert a curved needle in the holes to perform sutures. FIG. 13F shows a closeup view of a portion of component 1310 used for a suturing task, where a claw 1313 attached to an operating instrument manipulated by a trainee is routing a suture thread 1314 through holes 1312.

Figure 13G:
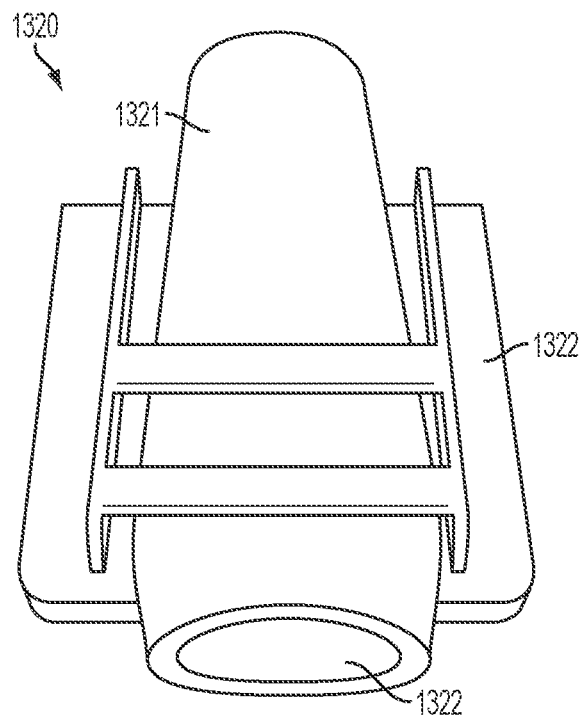
Figure 13H:
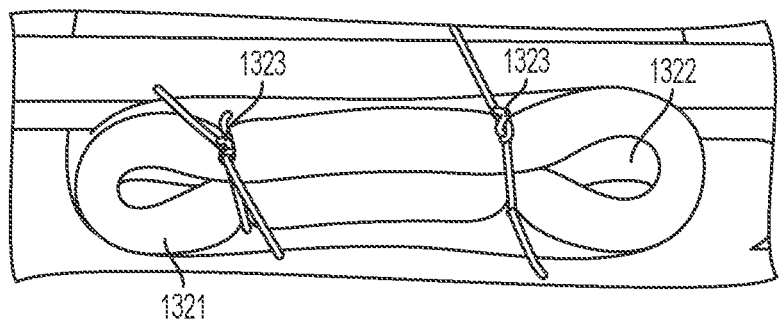

Exercise component 1320 of FIG. 13G can include a tubular or ring-shaped portion of soft material (e.g., foam) to simulate a structure often treated by surgeons. Tube piece 1321 can be held to the platform 106 by a support 1322. An opening 1323 of the piece 1321 can be exposed to allow a trainee to close the opening with sutures. FIG. 13H shows a closeup view of the tube piece 1321 in which a trainee has closed the opening 1322 with suture thread 1323.

Various exercise components 903 may be used to simulate various surgical tasks; components of FIGS. 13A-13H are merely illustrative. The abilities to easily and quickly remove and insert a platform in the anatomical model and change exercise components using platform systems such as shown in FIGS. 7-12 allows the anatomical model 101 to be easy to use, offering a large amount of surgical exercises for training while maintaining standardized port locations and robot setup across all exercises performed by the trainee.

In some implementations, while a surgical robot is coupled to cannulas inserted in the anatomical model, a platform 106 embodiment may be removed from the model (e.g., without undocking the robot manipulators from the associated cannulas or removing the endoscopic camera and tissue instruments from their associated cannulas). Then, either the removed platform 106 is reconfigured with another exercise component 903 or the removed first platform 106 is replaced by a second platform 106 with a second exercise component 903, so that a trainee must evaluate port placement in view of a task associated with the reconfigured or new platform 106. For example, one platform 106 embodiment may represent prostate location, which requires one set of port placements, and another platform 106 embodiment may represent upper abdomen lymph node location, which may require a second set of port placements. Since the platform 106 positions are the same with reference to base 102b (i.e., within the anatomical model), the surgical site locations are in their correct relative anatomical locations with reference to the anatomical model. If a trainee chooses an incorrect port placement pattern and is then required to complete the associated exercise task, the problems associated with the incorrect port placement (e.g., robotic manipulator collisions, instruments interfering with one another, inability to reach certain locations at the surgical site, proper camera position for viewing the surgical site during the operation, etc.) are highlighted and evaluated.

The features of the anatomical model allow a trainee to be scored during the training process, so that performance and improvement can be measured. In addition, a trainee can be scored in relation to other trainees or in relation to historic data in order to determine how well the trainee can perform the required task. Also, aggregate historical scoring may reveal that trainees have difficulty performing a certain task, and so training can be modified to improve a training program for that task.

In some examples, there can be two main categories of the training process. One skill category can be associated with actions physically near the patient's location (e.g., robot manipulator position and orientation setup, cannula port placement, docking, and the like)—so called "patient side" activities. The second skill category can be associated with performing the surgical task (e.g., telerobotically or manually positioning an endoscopic camera and moving tissue instruments at the surgical site). Parameters associated with these two categories may be evaluated to measure trainee improvement or to compare one trainee's performance parameters to corresponding parameters demonstrated by other trainees (concurrent or historic) or by persons considered to have expert skill levels. Thus a trainee's skill level in a particular parameter may be evaluated relative to peers (e.g., to determine the trainee's progress with reference to anticipated improvement) or relative to experts (e.g., to identify deviations from a high skill level). For patient side skills training, a trainee may be scored, for example, on how well port placement is selected for a selected surgical procedure, or how long it takes to determine the correct port placement. Or, a trainee may be scored on how the surgical robot is coupled to the placed cannulas (concerning, for example, manipulator arm collision avoidance) or how long it takes a trainee to couple the manipulators to the cannulas.

In one aspect, a trainee skill level associated with a specified parameter is automatically scored by using information obtained from a surgical robotic system. In a typical surgical robotic system, various sensors (e.g., joint position sensors, servo motor position encoders, fiber Bragg grating shape sensors, etc.) are used to determine kinematic information (position and/or orientation) associated with the robot manipulators. Consequently, a surgical task exercise scoring system may use the robot kinematic information to determine positions and orientations of instruments directed during an exercise, and thereby determine if a trainee has properly selected ports for a specific surgical task exercise. As an example of such a scoring system, a kinematic setup template is created that defines a specific effective robot manipulator position and orientation for a specific surgical task. Data associated with a trainee's surgical task exercise performance is compared against the template to create a performance score. For example, a task exercise time parameter may be measured by starting a timer at the beginning of a cannula docking exercise and stopping the timer when the surgical robotic system senses that all manipulators have been properly docked to an associated cannula. As another example, a task exercise robot manipulator collision avoidance parameter may be measured by comparing kinematic information from each docked robot manipulator against template kinematic information to determine how close a trainee has come to placing the manipulators in prescribed ideal positions and orientations or within prescribed position and orientation envelopes. Similarly, kinematic information from the robot manipulators, in conjunction with known physical dimensions of an anatomical model 101 (which may be various sizes, as described above) can be used to determine if a trainee has properly positioned the cannulas in a correct port placement pattern, or if the remote center of motion for each cannula (the location on each cannula that stays stationary in space as the manipulator moves) is correctly positioned so as to minimize tissue trauma at a patient's body wall. For any evaluation, metrics may be sampled during the exercise to indicate a trainee's performance as he or she completes the exercise, and these intermediate evaluations may be plotted against a template to obtain a score. For example, historic data may indicate that specific acts should be completed in a certain order in order to most effectively complete a task, kinematic data may be used to show the actual order in which a trainee performed the acts, and differences between the recommended versus actual order of acts completed is used to determine a trainee's score.

Figure 14:
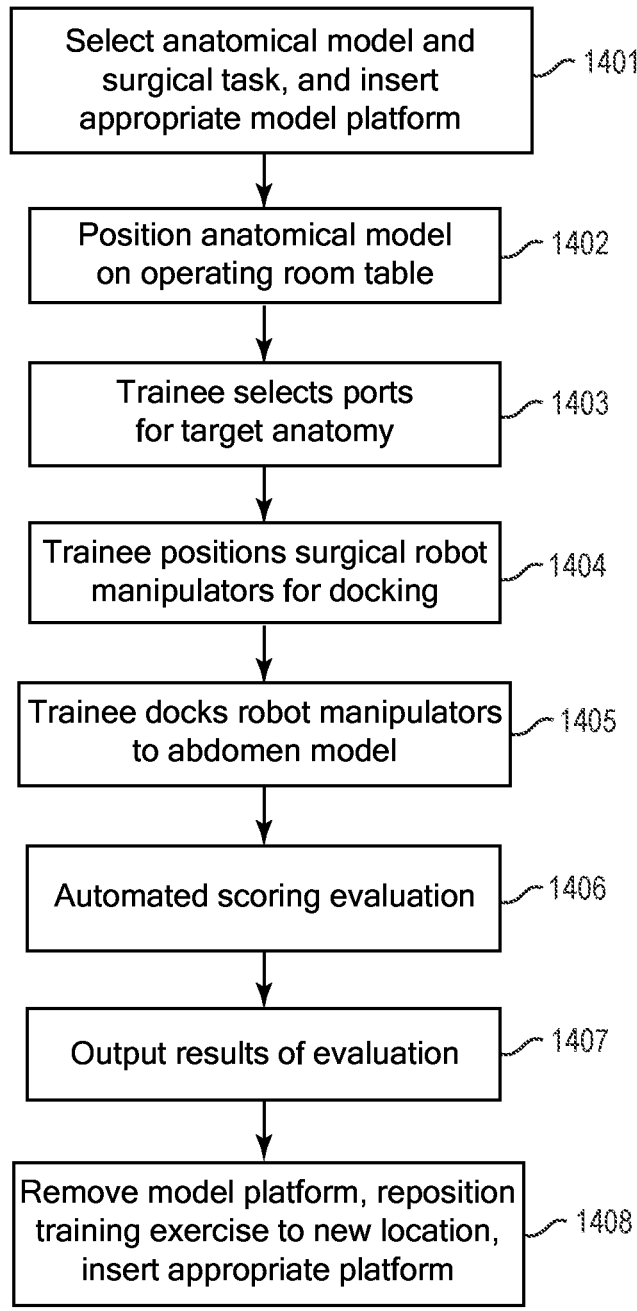
FIG. 14 is a flow chart that illustrates an example method for evaluating patient-side surgical task exercises.

FIG. 14 is a flow chart illustrating an example method for evaluating surgical task exercises. The example surgical exercise depicted in FIG. 14 is associated with the first category of training categories, patient side (e.g., setup) operations.

In block 1401, an anatomical model 101 is selected, a desired surgical task is selected, and a platform 106 associated with the selected surgical task is inserted inside the anatomical model. The platform 106 is provided with a simulating training exercise site selected to be appropriate for the surgical task and which is positioned on the platform for port placement appropriate for the surgical task through the holes 103 and 104 relative to the site. In block 1402, the anatomical model is positioned on an operating room table. Blocks 1401 and 1402 may be performed in any order.

Blocks 1403, 1404, and 1405 are example exercise actions generally for setting up a robotic surgical task, which are performed by a trainee and measured by an evaluation component. In block 1403, a trainee selects one or more ports for surgery for a specific target anatomy represented by the model. For example, camera cannulas and operating instrument cannulas can be placed so that the desired surgical site portions are in view of a camera instrument and are in operating range of operating instruments to be placed in the cannulas. One or more cannulas can be placed in one or more of the various holes in anatomical model embodiments described above, for example. In block 1404, the trainee positions surgical robot manipulators for docking in view of parameters such as mutual manipulator collision avoidance and required instrument range of motion. In block 1405, the trainee docks the robot manipulators to the associated cannulas. During blocks 1403, 1404, and 1405, an evaluation component of the exercise, e.g., implemented by one or more processors of the surgical robot, can measure parameters associated with the tasks performed by the trainee, such as the overall completion time of all tasks in blocks 1403 to 1405, completion time of particular tasks, position and orientation of manipulators, as well as other parameters of the actions taken by the trainee. Performance parameters (and metrics determined from the parameters) can be measured at multiple times during the performance of blocks 1403-1405.

In block 1406 an automatic evaluation of the surgical task is completed. For example, the automatic evaluation can use kinematic information from the robotic surgical system obtained during the performance of blocks 1403, 1404, and 1405. Such kinematic information can use remote center positions of the surgical instruments and setup joint values. The kinematic information can be compared to a template of desired or ideal kinematic information to determine if robot manipulator setup joints and other structures are properly configured to place the associated robot manipulators at a proper position and orientation, and if cannula ports are properly positioned and spaced to allow effective surgical site access with minimized manipulator collision avoidance. The ideal template information can be, for example, clustered or averaged positions, movements, and/or placements from prior performances of trainees and/or experts, or known optimal positions for instruments, robot components, etc.

As described above, in some implementations, the trainee's performance metrics for various skill parameters are based on measurements made at multiple times during the exercise. In some implementations, the individual trainee's performance can be compared to previous or historic performance data for that trainee and/or compared to historic performance data from other trainees and/or from experts to evaluate the trainee's relative learning speed and effectiveness and/or determined the trainee's skill level.

In block 1407, the results of the evaluation are output. In some examples, the results can be one or more scores that indicate a performance level or skill of the trainee based on the performance in blocks 1403-1405. Some implementations can provide graphical feedback indicating the level or skill. For example, graphical diagrams can be displayed on a display device indicating how close the robot manipulators are positioned to ideal or correct positions for the surgical task. Furthermore, some implementations can output real-time feedback during the performance of blocks 1403-1405, such as indicators of correct or incorrect placements and positions of surgical instruments, hints to the trainee, graphical indications of correct positioning and orientation and the acceptable range of motions and placements for particular instruments, etc. Some real-time feedback can be instructional, indicating where instruments should be placed or positioned. The robotic system, anatomical model, and trainee evaluation features can also be used to provide tutorials to persons, demonstrating how to select ports, position the robot, and dock robot arms.

In block 1408, various further actions may be taken to continue training, such as removing one platform 106 and replacing with a second platform 106 or second surgical task exercise, as described above, either with or without undocking the robot manipulators from the cannulas, and then the process may return to 1102 or other earlier block as appropriate.

Other patient-side tasks can also or alternatively be included in the exercise actions of blocks 1403-1405. For example, static registration techniques can be trained, which are used to determine the location of the abdomen model in space relative to surgical robot system components such as one or more instruments of the surgical robot 601. In some examples, static registration can include touching the anatomical model 101 in three or more known locations of the model with one of the robotic arms while recording the kinematic information sensed by sensors of the arms. This kinematic data can be used to determine the 3D location and orientation of the anatomical model relative to the robot system. For example, this allows the system to more easily determine the ports and model locations which a trainee is using and to provide directed feedback, evaluation, and scoring on such ports and how to move to the correct ports, if necessary.

Figure 15:
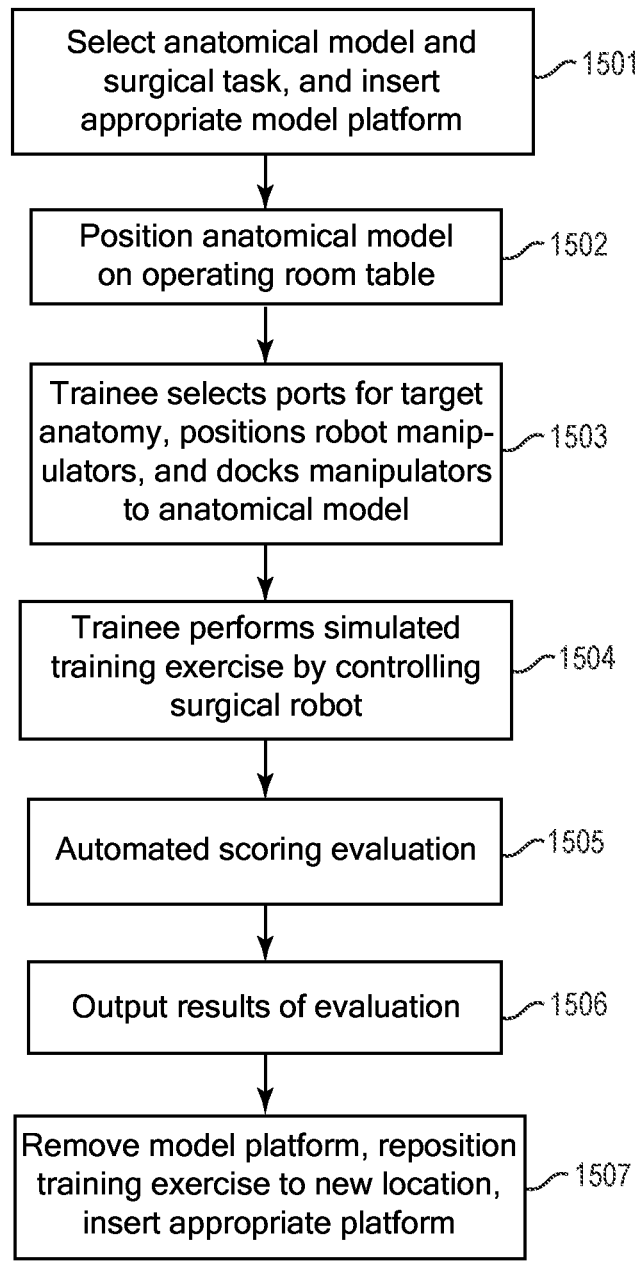
FIG. 15 is a flow chart that illustrates an example method for evaluating surgical task operations.

FIG. 15 is a flow chart illustrating another example method for evaluating surgical tasks. The example surgical exercises depicted in FIG. 15 are associated with the second category of training categories, surgical task operations performed at the surgical site in the anatomical model.

In block 1501, an anatomical model 101 is selected, a desired surgical task is selected, and a platform 106 associated with the selected surgical task is inserted inside the anatomical model. The platform has a training surgical site selected and positioned as appropriate for the selected surgical task. In block 1502, the anatomical model is positioned on an operating room table. Blocks 1501 and 1502 may be performed in any order.

In block 1503, a trainee selects ports for surgery associated with specific target anatomy, inserts the appropriate cannulas into the anatomical model 101, positions the robot manipulators, and docks the robotic manipulators to the associated cannulas. In some implementations, such patient-side actions can be measured in block 1503, as described above with reference to FIG. 14.

In block 1504, the trainee performs the simulated training exercise at the simulated surgical site inside the anatomical training model by teleoperating the robotic surgical instruments inserted through the cannulas. An example training exercise may be ones illustrated by components of FIGS. 13A-13H described above (e.g., suturing, manipulating objects, etc.), or one or more other simulated tasks. In some implementations, parameters are measured during the performance of block 1504, such as completion time of one or more tasks of the exercise, and robot kinematics for computing metrics (e.g., movement volume, errors in the exercise, economy of motion of the instruments, etc.). Performance parameters (and metrics determined from parameters) can be measured at multiple times during the performance of block 1504.

In one example, if using a component such as shown in FIGS. 13A-13D at the surgical site, a training procedure can require that the trainee pick up a ring 1305 with an operating instrument, move the ring along the pathway 1306 to a finish position (transferring the ring to another instrument controlled by a different hand as needed) without dropping the ring 1305, while moving the camera to keep the ring and instrument tips in the center of view at all times, and while repositioning controllers to keep the trainee's hands in central controlling positions. In another example, if using a suturing exercise component such as components of FIGS. 13E-13H, the trainee can be required to drive a needle in a predetermined pathway of suture holes in the component while keeping the site in view of the camera, or suture an opening closed with spatial requirements as to the locations of the sutures.

In block 1505, an automatic evaluation of the surgical task is completed. For example, parameters such as overall completion time and robot manipulator movements (e.g., within a particular range of motion envelope) can be scored against template values considered to be the correct parameters. Parameters that may be evaluated may include overall completion time, time to complete a particular training exercise and/or one or more stages within an exercise, errors made (e.g., dropping an item, breaking a suture, etc.) while completing the exercise, the volume covered by control inputs during the exercise, economy of control input motion, and frequency of moving the endoscope instrument during the task.

In block 1506, the results of the evaluation are output indicating an estimated level or skill of the trainee for the evaluated surgical exercise. Similarly as described above for FIG. 14, some implementations can provide graphical feedback, e.g., indicating how close the operating instrument end effectors are to ideal or correct positions for the surgical task, and/or ideal locations for sutures, cuts of tissue, etc. Furthermore, some implementations can output real-time feedback during the performance of blocks 1504, such as indicators of correct or incorrect sutures, instrument positions, hints to the trainee, etc. Some real-time feedback can be instructional, indicating how instruments should be placed, moved, or positioned.

In block 1507, various further actions may be taken to continue training, such as removing one platform 106 and replacing with a second platform 106 or second surgical task exercise, as described above, either with without undocking the robot manipulators from the cannulas. The process may return to a previous block, e.g., block 1502, 1503, or 1504, as appropriate.

Upon completion of an exercise, the metrics may be displayed to the trainee in the output block 1506 so that the trainee can monitor his or her progress, or can compare his or her performance against other persons from a novice to expert range. The anatomical model 101 facilitates such automated performance tracking because it allows repeatable and standardized placement of simulated training exercises regardless of instructor or trainee. Current anatomical models are inadequate for such standardized evaluation, and aspects described herein facilitate the required standardization to ensure that the exercises are identically configured for each use, thus ensuring standardized training evaluation against peers and experts. In some implementations, parameters and metrics can be displayed in real-time to the trainee during the performance of an exercise in block 1504.

Although the above methods in FIGS. 14 and 15 refer to measuring and evaluating performances from a single trainee, these methods can also be used to measure and evaluate performances of multiple trainees at once and in various roles during a training exercise. For example, the anatomical model and surgical robot system can provide training for teams of persons, such as one or more surgeons, assistants, nurses, etc. In some examples, one or more assistant trainees can perform patient-side surgical tasks for the method of FIG. 14 and a surgeon trainee can perform surgical operations in the method of FIG. 15 while operating a console. Trainees other than the surgeon can use the abdomen model to practice patient-side skills (e.g. port placement, docking, system setup, camera and instrument insertion) since they will often perform these activities in the operating room. The team can also train their communication to perform and coordinate various tasks such as exchange instruments, adjust ports, pass sutures using a conventional laparoscopic tool, coordinate a uterine manipulator to assist the console surgeon, etc.

In some implementations providing training for such teams of trainees, the evaluation and scoring methodology described above can be extended to evaluate the performance of operating room teams in addition to individual trainees. For example, various scores can be output indicating the performance level or skill for coordinated team tasks. Such evaluation can be assisted by automated metrics to track progress and compare to historical data similarly as described above. These features can help provide proficiency standards for teams to understand their efficiency and how they can improve.

The accurate tracking and comparison of a person's skill level as described above in the described training methods can provide important metrics useful in a variety of contexts. For example, certifying bodies, such as hospital credentialing committees, may use trainee evaluations and metrics to decide if a person is qualified for various medical practice areas or programs, such as performing robotic or manual minimally invasive surgery or qualifying for medical residency programs. Industry and academic researchers may also use such metrics to determine the relative effectiveness of various training programs or personnel actions associated with the anatomical model's capabilities, so that improved training methods and improved robotic platform configurations may be developed. Standardized port placement and exercise positioning as trained using disclosed features allows for comparison between subjects and quantification of results that can be included in summary documentation submitted to the Food and Drug Administration (FDA) or other governmental or controlling organizations. The standardization also allow consistent trainee setups and scenarios to be experienced by different users, enabling understanding of how they use the system and how certain features of the system can be improved, which in turn can be important for required testing of surgical systems as well as designing improvements to the systems. In a manufacturing context, such techniques also allow consistent and repeatable tests for systems coming off of an assembly line and ensure that all such systems are tested the same way. Such techniques also enable certain exercises to be directly replicated in a computer-simulated environment (e.g., ring manipulation) and used for side-by-side comparisons of computer simulation (dry-lab) and the physical simulation used in the training exercises. This can be important for computer simulation development to ensure a computer-simulated environment represents real world dynamics appropriately and teaches the trainee the proper skills (e.g., no negative learning). Direct side-by-side comparisons of this kind have been difficult in the past because a standardized setup for the physical exercises was difficult to achieve.

Furthermore, the anatomical model with multiple port locations enables clinical development engineers and surgeons to explore and develop new and advanced port placement options for various surgical procedures without requiring a porcine model or actual patient. This enables more thorough exploration and understanding of how new and improved port placements can be discovered. It also can help define procedure-recommended port locations for new surgical instruments, new robotic systems, etc.

Figure 16:
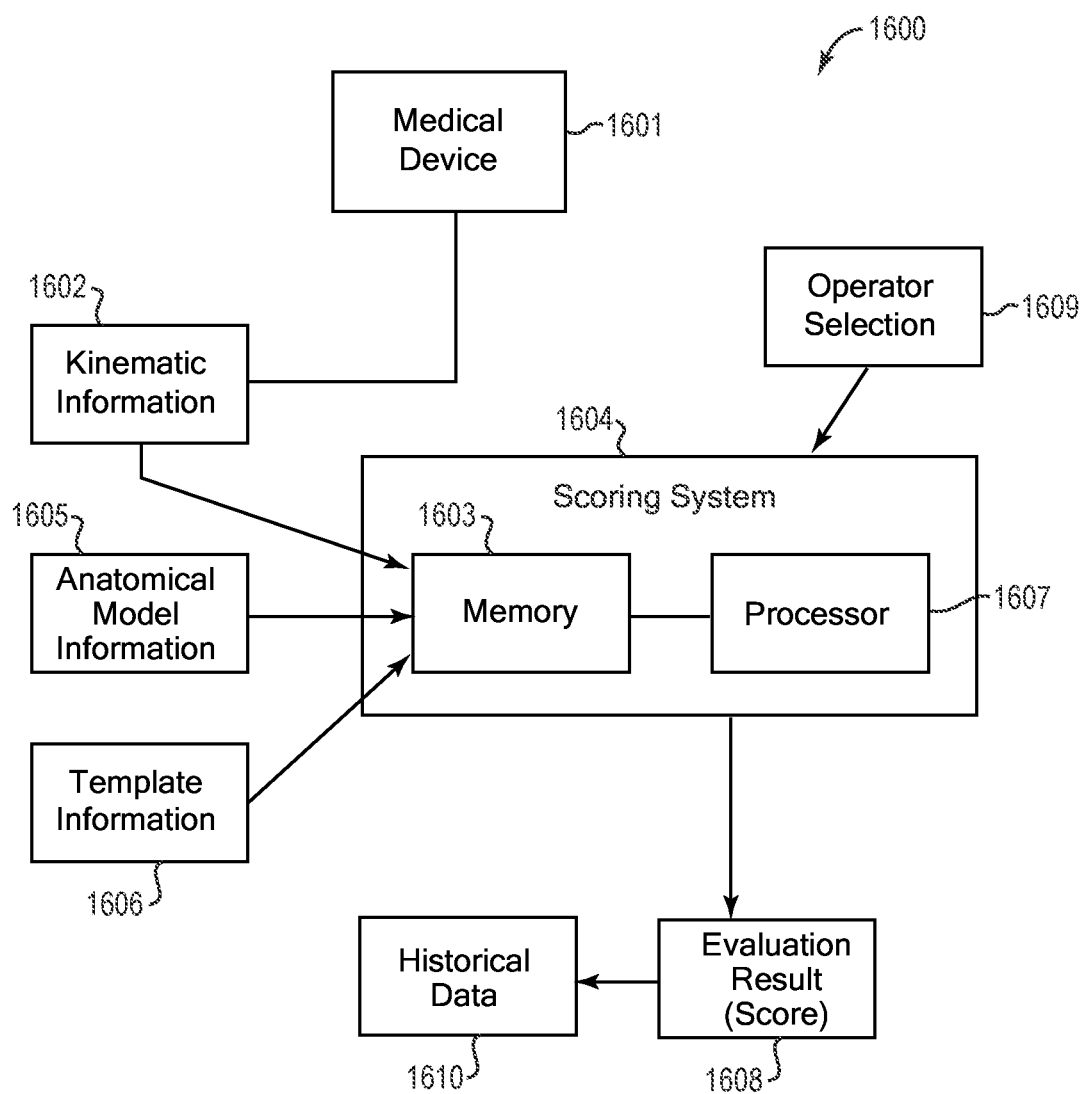
FIG. 16 is a diagrammatic view of an example system for performing surgical exercise tasks and evaluation.

FIG. 16 is a diagrammatic view that illustrates aspects of an example system 1600 which can be used for surgical exercise tasks and automated evaluation and scoring of surgical task exercises. As shown in FIG. 16, a medical device 1601 is used, which can be a robotic surgical system or other system that is capable of providing data concerning the position and/or orientation of one or more medical devices, such as a system including surgical robot 601. The medical device 601 provides kinematic information 1602 to be stored in a memory 1603 that is included in a scoring system 1604. Kinematic information 1602 can include performance parameters for a trainee's performance, as described above. Information 1602 may be provided, for example, via an application program interface (API) interface in a surgical robotic system. The kinematic information 1602 can be provided from a patient-side cart component (e.g., including cannulas, arms, and other features as shown in FIG. 6), and or the information 1602 can be provided from other components of the surgical robotic system, such as kinematic information describing position and/or orientation of controls for a operator (such as a surgeon or trainee) on a surgeon console used to manipulate surgical instruments provided on the patient-side cart. For example, such controls can include levers, joysticks, knobs, or other manipulandums moveable by the operator in one or more degrees of freedom.

In some embodiments, anatomical model information 1605 (e.g., physical dimensions, locations of possible cannula ports, location of surgical manipulators or instruments, etc.) associated with an anatomical model 101 is also input to the memory 1603. And, template information 1606 is input into memory 1603, indicating baseline, desired, and/or correct parameters and data for comparison to trainee performance parameters. Other parameter information can also be stored in memory 1603, such as data processed from kinematic information 1602 and event data, e.g., recorded times related to trainee tasks and task completions, etc., and which can be collected and/or determined by other components of system 1600 such as processor 1607, sensors of the system, etc. Thus, memory 1603 as depicted is symbolic of one or more physical memory locations that can store information that scoring system 1604 uses to carry out an evaluation of a trainee's performance. Such an evaluation is executed by processor 1607, which is likewise symbolic of one or more information processing devices (e.g., microprocessor(s) or other processing circuitry) that can be used to carry out the evaluation.

The evaluation results, such as one or more scores and/or other information, can be output via an output device 1608, such as a visible display on a display screen or other display device, a physical printout from a printer, or other output. The individual exercise results may be added to historic data 1610 (e.g., depending on an input at operator selection input 1609), which in turn may be used to modify template information 1606. In some embodiments, an operator input device 1609 enables a training system operator to input various selections related to training exercises, such as identifying a particular surgical exercise task to be carried out, and/or identifying a particular anatomical model that is being used. The scoring system can automatically select the appropriate information (e.g., proper template information 1606) to use to carry out the evaluation.

Embodiments of a scoring system 1604 may be implemented, for example, on a small computer system, such as a laptop computer or other electronic device, or they may be embedded in surgical robot systems (e.g., with outputs displayed via the robot system's displays). Such scoring systems may also be networked to a central database to facilitate data collection from a number of medical devices and from a population of medical personnel (e.g., surgeons) and to facilitate data and/or scoring comparison within the trainee or surgeon population.

In addition to use for robotic surgical system training, various features disclosed herein may be used for manual minimally invasive surgery. Scoring aspects for training can be adapted for training in such manual procedures, such as ability to reach locations at the surgical site, instrument interference, camera position, surgeon comfort, etc. Automated scoring aspects can be based on sensing a position of one or more components, such as cannulas, surgical instruments, etc. by various technologies such as machine vision, three dimensional tracking, fiber Bragg grating tether, electromagnetic position sensing, etc.

Features of anatomical models and surgical training methods are disclosed herein. In various implementations, a standardized anatomical model can provide a known configuration to be used for surgical training. Holes and cannula support pieces can be placed at known locations in the model. Various surgical task exercises can be placed inside the interior of the anatomic model at known, consistent locations. Standardized positioning allows training metrics to be determined for various tasks, such as tasks associated with setting up a surgical robotic system to perform a specific procedure on a patient and tasks associated with carrying out the procedure. Training methods associated with the use of the standardized model allow specific parameters to be consistently measured for a population of trainees or experts. A specific trainee's measured parameters can be compared against the measured parameters of peer or expert populations or other reference data, and an evaluation can be determined and output. Furthermore, many of the metrics that can be captured with the disclosed models and methods are far greater in type and scope than what is measureable in previous and traditional laparoscopic training exercises. This can be of great advantage for analyzing, improving, and innovating surgical procedures and equipment.

In the disclosure herein, the term "flexible" in association with a part, such as a mechanical structure, component, or component assembly, should be broadly construed. In essence, the term means the part can be repeatedly bent and restored to an original shape without harm to the part. Many "rigid" objects have a slight inherent resilient "bendiness" due to material properties, although such objects are not considered "flexible" as the term is used herein. A flexible part may have infinite degrees of freedom (DOF's). Examples of such parts include closed, bendable tubes (made from, e.g., NITINOL, polymer, soft rubber, and the like), helical coil springs, etc. that can be bent into various simple or compound curves, often without significant cross-sectional deformation. Other flexible parts may approximate such an infinite-DOF part by using a series of closely spaced components that are similar to a snake-like arrangement of serial "vertebrae". In such a vertebral arrangement, each component is a short link in a kinematic chain, and movable mechanical constraints (e.g., pin hinge, cup and ball, live hinge, and the like) between each link may allow one (e.g., pitch) or two (e.g., pitch and yaw) DOF's of relative movement between the links. A short, flexible part may serve as, and be modeled as, a single mechanical constraint (joint) that provides one or more DOF's between two links in a kinematic chain, even though the flexible part itself may be a kinematic chain made of several coupled links. Knowledgeable persons will understand that a part's flexibility may be expressed in terms of its stiffness.

Unless otherwise stated in this description, a flexible part, such as a mechanical structure, component, or component assembly, may be either actively or passively flexible. An actively flexible part may be bent by using forces inherently associated with the part itself. For example, one or more tendons may be routed lengthwise along the part and offset from the part's longitudinal axis, so that tension on the one or more tendons causes the part or a portion of the part to bend. Other ways of actively bending an actively flexible part include, without limitation, the use of pneumatic or hydraulic power, gears, electroactive polymer (more generally, "artificial muscle"), and the like. A passively flexible part is bent by using a force external to the part (e.g., an applied mechanical or electromagnetic force). A passively flexible part may remain in its bent shape until bent again, or it may have an inherent characteristic that tends to restore the part to an original shape. An example of a passively flexible part with inherent stiffness is a plastic rod or a resilient rubber tube. An actively flexible part, when not actuated by its inherently associated forces, may be passively flexible. A single part may be made of one or more actively and passively flexible parts in series.

This description and the accompanying drawings that illustrate features and implementations should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure described features.

Further, this description's terminology is not intended to limit the scope of the claims. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes includes various special device positions and orientations. In addition, the singular forms "a", "an", and "the" are intended to include the plural forms as well, unless the context indicates otherwise. Components described as coupled may be electrically or mechanically directly coupled, or they may be indirectly coupled via one or more intermediate components.

Elements described in detail with reference to one implementation may, whenever practical, be included in other implementations in which they are not specifically shown or described unless the one or more elements would make an implementation non-functional or provide conflicting functions. For example, if an element is described in detail with reference to one embodiment and is not described with reference to a second embodiment, the element may nevertheless be included in the second embodiment.

The functional methods, blocks, features, devices, and systems described in the present disclosure may be integrated or divided into different combinations as would be known to those skilled in the art. Disclosed methods and operations may be presented in a specific order, but the order may be changed in different particular implementations. In some implementations, multiple steps or blocks shown as sequential in this disclosure may be performed at least partially at the same time.

We claim:

1. A surgical system comprising:
   a memory, one or more processors configured to access the memory, and an output device in communication with the one or more processors;
   wherein the one or more processors are configured to perform operations comprising:
      measuring one or more performance parameters associated with one or more tasks performed by at least one user,
      performing an automatic comparison between the one or more performance parameters and corresponding one or more stored task parameters associated with the one or more tasks, and
      determining an evaluation based on the automatic comparison;
   wherein the one or more tasks are performed with reference to a worksite and a manipulator arm;
   wherein the one or more tasks include positioning the manipulator arm relative to the worksite;
   wherein the manipulator arm is moveable to positions controlled by one or more moveable controls separate from the manipulator arm;
   wherein the performance parameters include one or more positions of the manipulator arm; and
   wherein the output device is configured to generate an output based on the evaluation.

2. The surgical system of claim 1, wherein:
the one or more performance parameters comprise at least one performance parameter based on kinematic information sensed for the manipulator arm.

3. The surgical system of claim 1, wherein:
the manipulator arm is one of a plurality of manipulator arms; and
the operation of determining the evaluation based on the automatic comparison comprises determining whether the positioning of the manipulator arm will cause the manipulator arm to physically collide with at least one other manipulator arm of the plurality of manipulator arms during performance of a surgical procedure in which the plurality of manipulator arms is used.

4. The surgical system of claim 1, wherein:
the worksite is included in an anatomical model;
the manipulator arm is one of a plurality of individual manipulator arms;
the one or more tasks comprises placement of a plurality of individual ports into the anatomical model; and
each one of the individual ports is configured to receive a corresponding surgical instrument connected to a corresponding one of the individual manipulator arms.

5. The surgical system of claim 4, wherein:
the operation of determining the evaluation comprises determining whether the placement of the individual ports will cause collisions amongst the individual manipulator arms while each one of the individual manipulator arms is coupled to a corresponding one of the individual ports during a surgical procedure.

6. The surgical system of claim 4, wherein:
the anatomical model comprises a base portion, a top portion coupled to the base portion, a plurality of cannula supports, and a platform removably coupled to the base portion;
the base portion forms a hollow space between the base portion and the top portion;
the top portion comprises a plurality of holes;
each individual cannula support of the plurality of cannula supports is aligned with one or more corresponding individual holes of the plurality of holes;
the platform comprises a plurality of attachment mechanisms;
each individual attachment mechanism of the plurality of attachment mechanisms is at a different location on the platform and is configured to removably attach to a corresponding individual surgical exercise component; and
the placement of the plurality of individual ports comprises placement of one or more cannulas in one or more of the plurality of cannula supports.

7. The surgical system of claim 1, wherein:
the worksite is included in an anatomical model;
the manipulator arm is one of a plurality of individual manipulator arms; and
the one or more tasks comprise docking a plurality of individual surgical instruments, each connected to a corresponding one of the individual manipulator arms, to corresponding individual ports in the anatomical model.

8. The surgical system of claim 1, wherein:
the corresponding one or more stored task parameters are measured based on a previous performance of the one or more tasks prior to performance of the one or more tasks.

9. The surgical system of claim 1, wherein:
the manipulator arm includes one or more joints;
the performance parameters comprise one or more parameters based on sensed kinematic information for the manipulator arm; and
the kinematic information comprises position and orientation of a surgical instrument coupled to the manipulator arm based on sensed joint values of the one or more joints of the manipulator arm.

10. A surgical training method comprising:
measuring one or more performance parameters associated with one or more tasks performed by at least one user, the one or more tasks performed with reference to a worksite and a manipulator arm, wherein the one or more tasks include positioning of the manipulator arm relative to the worksite, and wherein the manipulator arm is moveable to positions controlled by one or more moveable controls separate from the manipulator arm;
performing an automatic comparison between the one or more performance parameters and one or more corresponding stored parameters associated with the one or more tasks, wherein the performance parameters include the positions of the manipulator arm;
determining, by one or more processors, an evaluation based on the automatic comparison; and
generating an output based on the evaluation using one or more output devices.

11. The surgical training method of claim 10, wherein the manipulator arm is one of a plurality of manipulator arms, and wherein determining the evaluation includes checking whether positioning of the plurality of manipulator arms will cause the plurality of manipulator arms to physically collide with each other during performance of a surgical procedure using the plurality of manipulator arm.

12. The surgical training method of claim 10, wherein the manipulator arm is one of a plurality of manipulator arms and the worksite is included in an anatomical model, and wherein the one or more tasks further include placement of ports in the anatomical model configured to receive surgical instruments connected to the plurality of manipulator arms.

13. The surgical training method of claim 12, wherein determining the evaluation includes determining whether the placement of the ports would cause collisions amongst the plurality of manipulator arms when the plurality of manipulator arms are coupled to the ports during a surgical procedure.

14. The surgical training method of claim 10, wherein the manipulator arm is one of a plurality of manipulator arms and the worksite is included in an anatomical model, and wherein the one or more tasks further include docking of surgical instruments connected to the plurality of manipulator arms to ports in the anatomical model.

15. The surgical training method of claim 10, wherein the performance parameters include one or more performance parameters based on kinematic information sensed for the manipulator arm.

16. The surgical training method of claim 10,
wherein the one or more tasks are a plurality of tasks;
wherein the surgical training method further includes determining an order of performance of the plurality of tasks, and comparing the order of performance to a stored reference order of the plurality of tasks; and
wherein the evaluation is based on the comparing of the order of performance and the reference order.

17. The surgical training method of claim 10, wherein:
the worksite is included in an anatomical model;
the manipulator arm is one of a plurality of individual manipulator arms; and the one or more tasks comprise docking a plurality of individual surgical instruments, each connected to a corresponding one of the individual manipulator arms, to corresponding individual ports in the anatomical model.

18. A surgical training method comprising:

measuring performance parameters associated with a plurality of tasks;

performing an automatic comparison between the performance parameters and corresponding stored parameters associated with the plurality of tasks;

determining, by one or more processors, an evaluation that is based on the automatic comparison; and generating, using one or more output devices, an output based on the evaluation, wherein the one or more output devices are in communication with the one or more processors;

wherein the plurality of tasks are each performed with a manipulator arm with reference to an anatomical model;

wherein the manipulator arm is moveable to positions controlled by one or more moveable controls separate from the manipulator arm;

wherein the plurality of tasks include one or more of surgical instrument port placement, manipulator arm setup, or docking a cannula;

wherein the surgical instrument port placement includes selection of a location on the anatomical model and placement of the cannula at the location;

wherein the manipulator arm setup includes placement of the manipulator arm relative to the anatomical model; and wherein the docking includes coupling of the manipulator arm to the cannula.

19. The surgical training method of claim 18, wherein the manipulator arm is one of a plurality of manipulator arms, and wherein determining the evaluation includes checking whether docking of one or more instruments of the plurality of manipulator arms will cause multiple manipulator arms of the plurality of manipulator arms to physically collide with each other during performance of a surgical procedure following the docking of the one or more instruments.

20. The surgical training method of claim 18, wherein the manipulator arm is one of a plurality of manipulator arms included in a surgical device, wherein the one or more tasks further include:

selection of one or more ports in the anatomical model, and wherein the ports are configured to receive surgical instruments of the plurality of manipulator arms for a surgical procedure; and contact of the manipulator arm with a plurality of locations of the anatomical model prior to placement of one or more joints of the manipulator arm and docking an instrument coupled to the manipulator arm; and wherein the surgical training method further includes using kinematic information sensed by one or more sensors of one or more joints of the manipulator arm at the plurality of locations to determine a location of the anatomical model in space relative to the surgical device.

* * * * *

UNITED STATES PATENT AND TRADEMARK OFFICE
CERTIFICATE OF CORRECTION

PATENT NO. : 11,727,827 B2
APPLICATION NO. : 17/177028
DATED : August 15, 2023
INVENTOR(S) : Jarc et al.

Page 1 of 1

It is certified that error appears in the above-identified patent and that said Letters Patent is hereby corrected as shown below:

In the Claims

In Column 24, Line 34, delete "arm." and insert -- arms. -- therefor.

Signed and Sealed this
Eighteenth Day of November, 2025

John A. Squires
*Director of the United States Patent and Trademark Office*